US012811807B1

(12) United States Patent
Schneider

(10) Patent No.: US 12,811,807 B1
(45) Date of Patent: Nov. 24, 2026

(54) SYSTEM, METHOD, PRODUCT, AND APPARATUS FOR HARDWARE-NODE LIFECYCLE AND LINEAGE MANAGEMENT

(71) Applicant: Eric Schneider, Hallandale Beach, FL (US)

(72) Inventor: Eric Schneider, Hallandale Beach, FL (US)

( * ) Notice: Subject to any disclaimer, the term of this patent is extended or adjusted under 35 U.S.C. 154(b) by 0 days.

(21) Appl. No.: 19/639,199

(22) Filed: Apr. 4, 2026

(51) Int. Cl.
*G06F 21/64* (2013.01)
*H04L 9/08* (2006.01)
*H04L 9/32* (2006.01)

(52) U.S. Cl.
CPC .......... *H04L 9/3247* (2013.01); *H04L 9/0819* (2013.01); *H04L 9/0869* (2013.01); *H04L 9/3218* (2013.01); *H04L 9/3242* (2013.01)

(58) Field of Classification Search
CPC ... H04L 9/3247; H04L 9/0819; H04L 9/0869; H04L 9/3218; H04L 9/3242; G06F 21/64
See application file for complete search history.

(56) References Cited

U.S. PATENT DOCUMENTS 7,520,430 B1 4/2009 Stewart et al.
8,880,434 B2 11/2014 Bemmel et al.
9,836,743 B2 12/2017 Celikyilmaz et al.
10,187,494 B2 1/2019 Stewart et al.
10,503,905 B1 * 12/2019 Misra ...................... G06F 21/64
10,504,110 B2 12/2019 Inotay et al.
10,521,866 B2 12/2019 Faro
10,628,825 B2 4/2020 Tavarez
11,488,173 B1 11/2022 Favero et al.
11,531,975 B2 * 12/2022 Verma ................ G06Q 20/0655
12,423,748 B1 9/2025 Dent et al.
2017/0316390 A1 * 11/2017 Smith .................. G06Q 20/407
(Continued)

OTHER PUBLICATIONS

Eric Schneider; "System, Method, Product, and Apparatus for Autonomous Transaction Initiation via Unprompted Machine-Readable Signals"; Unpublished U.S. Appl. No. 19/553,185, filed Feb. 27, 2026.
(Continued)

*Primary Examiner* — Michael Won

(57) ABSTRACT

An apparatus and system for decentralized hardware-node lifecycle management, lineage-based quarantine, and multi-tenant data proxying are disclosed. The apparatus utilizes a hardware root of trust and a validation processor to manage a merchant lineage derived from a shared root merchant key. The system enforces silicon-level identity by generating unique derivation paths for sibling hardware nodes, publishing permissioning states to a persistent ledger, and executing autonomous revocation or quarantine via a lineage-void circuit upon detecting compromised nodes. For interoperability, the apparatus establishes zero-trust sequestration channels to proxy data for guest hardware nodes possessing external roots of trust while suppressing local nullification signals. Furthermore, the apparatus provides a secondary validation layer by intercepting peer-to-peer handshakes between sibling nodes to generate hardware-signed witness-attestation signatures. The architecture ensures hardware-enforced isolation and cryptographic integrity for transaction reconciliation across geographically dispersed, decentralized networks without requiring persistent external connectivity.

30 Claims, 20 Drawing Sheets

(56) References Cited

U.S. PATENT DOCUMENTS

| | | | | |
|---|---|---|---|---|
| 2018/0196945 | A1* | 7/2018 | Kornegay | G06F 21/57 |
| 2024/0037513 | A1 | 2/2024 | Thairu et al. | |
| 2026/0059002 | A1* | 2/2026 | Westgate | G06F 16/215 |

OTHER PUBLICATIONS

Eric Schneider; "System, Method, Product, and Device for Hardware Sequestration and Atomic State-Modification of Discrete-State Data Objects"; Unpublished U.S. Appl. No. 19/558,312, filed Mar. 5, 2026.

Eric Schneider; "System, Method, Product, and Apparatus for Discrete Payload Object Provisioning and Attested Sequestration Confirmation Generation"; Unpublished U.S. Appl. No. 19/567,209, filed Mar. 15, 2026.

Eric Schneider; "System, Method, Product, and Apparatus for the Ledger Lifecycle of Attested Sequestration States"; Unpublished U.S. Appl. No. 19/635,628, filed Mar. 31, 2026.

Eric Schneider; "System, Method, Product, and Apparatus for Hardware-Attested Data Aggregation, Dynamic Liquidity Balancing, and Autonomous Settlement"; Unpublished U.S. Appl. No. 19/643,030, filed Apr. 9, 2026.

* cited by examiner

SYSTEM, METHOD, PRODUCT, AND APPARATUS FOR HARDWARE-NODE LIFECYCLE AND LINEAGE MANAGEMENT

FIELD OF THE DISCLOSURE

The present disclosure relates generally to the management of remote hardware nodes within a distributed cryptographic ecosystem. More specifically, the present disclosure relates to an apparatus and system for enforcing a merchant-lineage through hardware-bound identity attestation, temporal synchronization, and the isolation of compromised hardware branches to ensure the integrity of a decentralized network.

BACKGROUND OF THE DISCLOSURE

The management of hardware-node populations in decentralized environments is currently defined by a fragmented landscape of disparate technical disciplines, each operating within inherent physical or logical constraints. Existing systems for processing secure transactions, maintaining cryptographic identity, and ensuring fleet-wide synchronization have historically functioned as siloed approaches, resulting in a technical vacuum where physical location, temporal integrity, and lineage-bound reconciliation frequently collide.

In the field of mobile device management, oversight is often predicated on a persistent administrative heartbeat. This creates an inherent physical constraint where the security posture of a hardware node is primarily verifiable only during active communication with a central authority. Consequently, when a node enters a restricted-connectivity or autonomous state, the ability to enforce unit-level restrictions or verify the integrity of local state adjustments becomes functionally limited. This structural vacuum results in a period of observable decay where the internal state of a remote node can diverge from the authorized fleet policy without detection.

Parallel to this, conventional hierarchical deterministic systems manage identity through static derivation trees. While these structures allow for the generation of multiple keys from a shared seed, a fundamental trade-off exists between the scalability of the lineage and the ability to maintain real-time visibility into the aggregate unit-impact across a population of sibling units. Once a sub-key is deployed to a field unit, there is no inherent, hardware-enforced mechanism to reconcile the velocity of local transactions with the global settlement manifest. This results in a persistent integrity-gap where the logical lineage remains vulnerable to desynchronization events that standard protocols are not architected to suppress at the silicon level.

Furthermore, traditional hardware-bound attestation methods provide a point-in-time snapshot of firmware integrity but remain largely sequestered from the transactional state of a distributed ledger. A hardware node may demonstrate an authorized boot state while simultaneously harboring a transaction history that contradicts the broader merchant lineage. This disconnect ensures that even when hardware remains physically intact, the logical state remains susceptible to temporal drift and replay anomalies. Even the combination of these fields results in a functional deficit; a system may be cryptographically isolated and temporally synchronized, yet still remain incapable of autonomous, lineage-aware reconciliation when sibling nodes must interoperate without a central gatekeeper.

Accordingly, in light of the above, there is a need for a hardware-integrated system and method for decentralized node orchestration and lineage-bound reconciliation that maintains state-finality across a population of hardware nodes. The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY OF THE DISCLOSURE

The present disclosure relates to a hardware-integrated management apparatus and system for decentralized node orchestration within a lineage-bound merchant environment. In particular, the disclosure provides a multi-layer functional architecture configured to enforce identity, temporal, and value integrity across a population of sibling hardware nodes. By utilizing a hardware-protected execution environment (HPEE) and a root merchant key, the system facilitates secure lifecycle management, autonomous reconciliation of unit-value adjustments, and localized state-finality, ensuring that transaction-level commitments remain cryptographically tethered to a shared merchant ancestry even during periods of network latency or offline operation.

Furthermore, the disclosure addresses the technical challenges of maintaining global ledger consistency through asynchronous state-resolution and lineage-based quarantine protocols. The apparatus is configured to monitor cryptographically-validated data streams to identify and resolve settled status events, while simultaneously providing a zero-trust sequestration-channel for guest hardware entities. Through the integration of a master epoch counter and drift-compensation logic, the system maintains high-fidelity synchronization between proximate nodes, enabling a robust, self-healing hardware ecosystem capable of mitigating both temporal drift and complex lineage-integrity threats without requiring constant centralized oversight.

In one aspect of the present disclosure an apparatus for hardware-node lifecycle management includes a registry interface configured to receive an attested identity record from a remote hardware node and a memory and a processor configured to validate the attested identity record against a hardware root of trust generate a unique derivation path for the remote hardware node to identify the remote hardware node as a sibling unit within a merchant lineage and publish a permissioning state to a persistent ledger where the permissioning state is configured to authorize a synchronization node to accept records from the remote hardware node and the apparatus further includes a monitoring interface configured to update the permissioning state in response to a revocation event to nullify a capability of the remote hardware node to commit records to the persistent ledger.

In another aspect of the present disclosure an apparatus for merchant-lineage quarantine includes a memory configured to store a shared root merchant key and a lineage archive containing a plurality of sibling hardware identifiers derived from the shared root merchant key and a monitoring interface configured to receive a lineage-integrity alert identifying a specific sibling hardware identifier as a compromised node and a processor configured to verify the lineage-integrity alert against a hardware root of trust and identify a subset of at-risk sibling hardware identifiers based on a shared derivation branch within a merchant lineage relative to the compromised node by querying the lineage archive.

In a further aspect of the present disclosure an apparatus for lineage-agnostic data proxying includes a local interface configured to establish a physical communication link with a guest hardware node and a memory and a registry interface operable via the local interface to identify the guest hardware node where the guest hardware node possesses a hardware root of trust external to a local merchant lineage and a processor configured to establish a zero-trust sequestration-channel for the guest hardware node via the local interface and assign a guest-proxy identifier to a data packet received from the guest hardware node and a network interface configured to relay the data packet to a distributed ledger while concurrently suppressing a generation of a local nullification signal for the guest hardware node.

In another aspect of the present disclosure an apparatus for merchant-witnessed transaction validation includes a local-monitoring interface configured to intercept a peer-to-peer handshake between a first sibling hardware node and a second sibling hardware node and a memory and a processor configured to extract a provisional unit commitment from the peer-to-peer handshake verify that the first sibling hardware node and the second sibling hardware node are associated with a shared merchant-lineage derived from a common root merchant key and generate a witness-attestation signature where the witness-attestation signature cryptographically binds the provisional unit commitment to a hardware identity of the apparatus and a network interface configured to transmit the witness-attestation signature to a distributed ledger to provide a secondary validation layer for the peer-to-peer handshake.

In a further aspect of the present disclosure an apparatus for autonomous lineage-reconciliation includes a hardware-protected execution environment configured to maintain a running-inflow accumulator and a root merchant key and a memory configured to store a settlement manifest and a network interface configured to retrieve the settlement manifest from a persistent ledger and a processor configured to update the running-inflow accumulator within the hardware-protected execution environment based on transaction records received from a plurality of sibling hardware nodes associated with a shared merchant lineage calculate a variance parameter between a total unit value in the running-inflow accumulator and a total settled value extracted from the settlement manifest and execute a reconciliation-response routine to protect the root merchant key within the hardware-protected execution environment in response to the variance parameter exceeding a reconciliation threshold.

In another aspect of the present disclosure an apparatus for merchant-lineage synchronization includes a protected partition configured to maintain a master epoch counter and a memory and a local communication interface configured to perform a periodic handshake with a sibling hardware node and a processor configured to extract a local clock state from the sibling hardware node calculate a temporal-drift parameter between the local clock state and the master epoch counter and generate a signed epoch-attestation comprising a clock-correction command and a distribution interface configured to push the signed epoch-attestation to the sibling hardware node to reset an internal stale-data timer within the sibling hardware node.

In a further aspect of the present disclosure an apparatus for localized state-finality includes a local interface configured to receive an attested sequestration-confirmation record from a proximate hardware node and a memory and a processor configured to verify the attested sequestration-confirmation record against a merchant-lineage archive stored in the memory calculate a local-finality threshold based on a unit adjustment identified within the attested sequestration-confirmation record and generate a local nullification signal to modify a status byte on the proximate hardware node contingent upon the unit adjustment satisfying the local-finality threshold and a distribution interface configured to transmit the local nullification signal to the proximate hardware node to trigger a state change in the status byte.

In another aspect of the present disclosure an apparatus for asynchronous state-resolution includes a protected partition configured to store a root merchant key and a memory and a network interface configured to monitor a cryptographically-validated data stream for a settled status event associated with a retrieval-pointer and a processor configured to extract a self-authenticating nullification signal from the settled status event and verify that the retrieval-pointer corresponds to a sibling hardware node sharing a common merchant lineage derived from the root merchant key and a distribution interface configured to relay the self-authenticating nullification signal to the sibling hardware node to trigger a state change in a status byte therein.

In accordance with additional aspects of the present disclosure, there are provided various methods, apparatuses, systems, and non-transitory computer-readable media that implement the functionality described herein. It is expressly contemplated that any functional step described in relation to a method shall find corresponding support as a structural component of an apparatus or system, and any structural feature described as part of an apparatus or system shall find corresponding support as a step in a method of operation. Specifically, the disclosure provides an apparatus and system configured to implement the functionality of the methods described above, as well as a non-transitory computer-readable medium comprising instructions that, when executed by a processor, cause the processor to perform said methods and realize the technical objectives of the recited apparatuses.

The apparatus and system described herein offer a robust architecture for securing decentralized hardware networks by establishing a hardware-bound lineage that prevents the vertical migration of security breaches. By utilizing unique derivation paths and identity attestation, the system ensures that every node is cryptographically isolated within its own branch, effectively limiting the blast radius of a compromised unit and protecting the master merchant root from unauthorized access. This hierarchical structure allows for the granular quarantine of specific sub-sets of nodes without necessitating a global system shutdown, thereby maintaining operational continuity for the remainder of the fleet.

A significant advantage is found in the autonomous enforcement of temporal and logical constraints, which eliminates the reliance on a persistent external administrative heartbeat. Through the use of internal master epoch counters and drift comparison logic, the hardware can independently verify its own authorization window and execute self-nullification protocols if synchronization is lost or tampered with. This creates a fail-closed security posture where nodes automatically transition to a restricted state in real-time, providing an immediate defense against stolen or relocated hardware that traditional top-down revocation lists cannot achieve.

The disclosure further provides enhanced data integrity and resilience through hardware-enforced finality and atomic commitment protocols. By integrating power-monitoring circuits with non-volatile persistence buffers, the system ensures that critical transaction records and state transitions are securely committed even during sudden power loss or physical tampering events. Additionally, the implementation of a guest proxy sub-system with a physical logic-gap barrier allows the merchant to facilitate third-party integrations and ingest external telemetry safely. This ensures that foreign data traffic is sequestered within isolated zero-trust channels, preventing cross-lineage data leakage and maintaining the sanctity of the primary merchant environment.

Furthermore, the system provides a high degree of forensic accountability and administrative flexibility through attested identity records and manual override capabilities. Every failure state or quarantine event is logged within a secure forensic unit, providing a hardware-attested audit trail for security researchers and auditors. The inclusion of a dedicated administrative interface ensures that while the system is autonomously secure, an authorized human-in-the-loop can perform manual recoveries and node restorations following a physical audit. This balance of automated hardware enforcement and managed oversight results in a highly resilient, interoperable, and secure ecosystem for managing large-scale hardware deployments. The foregoing and other features of the present disclosure are hereinafter fully described and particularly pointed out in the claims. The following description and the annexed drawings set forth in detail one or more illustrative aspects of the disclosure, such being indicative, however, of but one or a few of the various ways in which the principles of the described embodiments and their equivalents may be employed.

DETAILED DESCRIPTION OF THE DISCLOSURE

Figure 1:
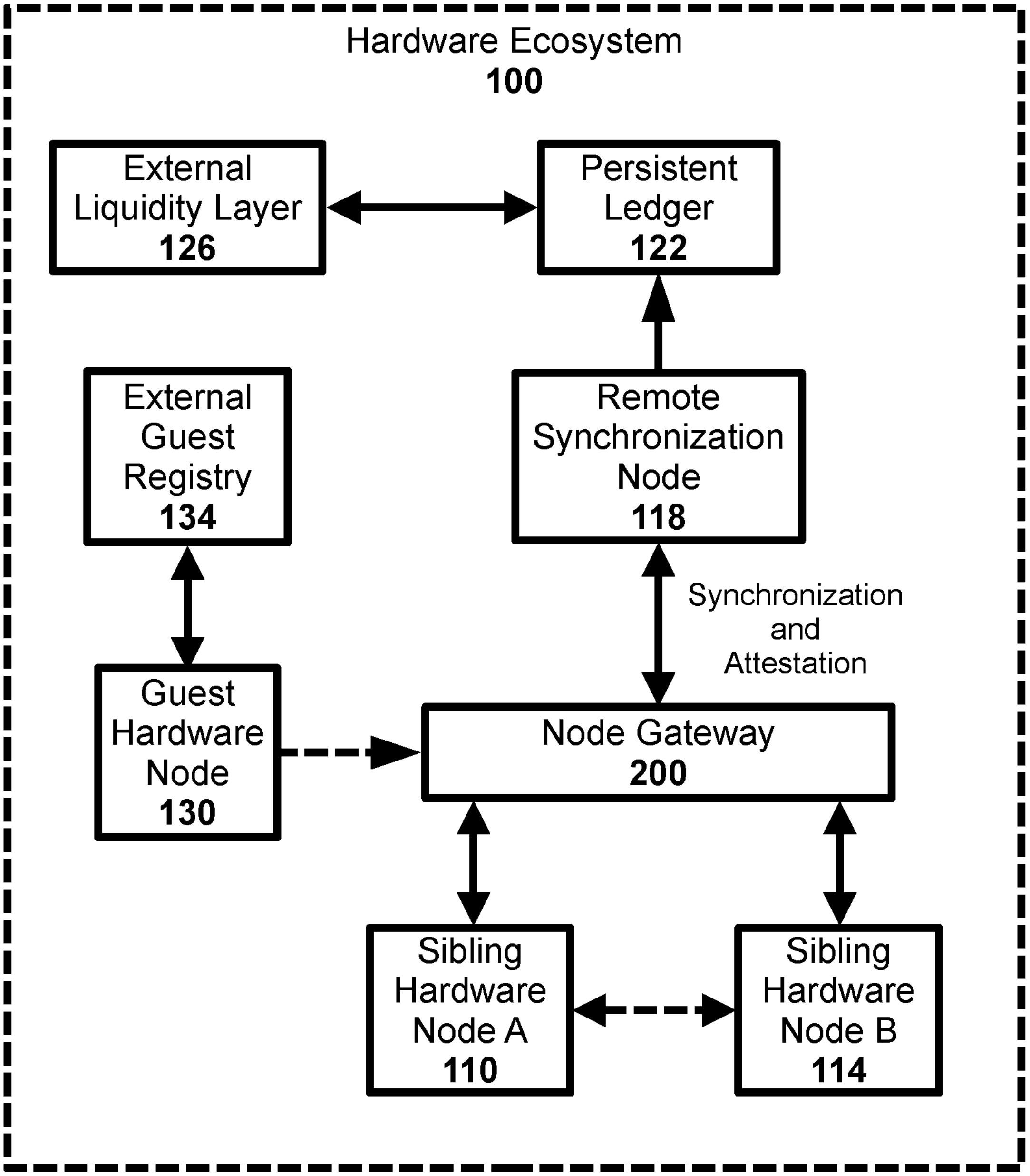
FIG. 1 is a block diagram illustrating a hardware-node ecosystem comprising a registry interface, a persistent ledger, and a plurality of sibling hardware nodes in accordance with the present disclosure.

The present disclosure will now be described with reference to the drawings, wherein like reference numerals are used to refer to like elements disclosed herein.

For the purposes of the present disclosure, the following technical terms and phrases are to be interpreted according to the specific definitions and functional requirements set forth below, notwithstanding any broader or more generic usage found in external dictionaries or industry standards. The term registry interface encompasses any communication boundary, logical port, or hardware-abstracted gate designed to receive data, while an attested identity record comprises any digital credential or verifiable statement of a node's internal state. The hardware root of trust represents a foundational, non-modifiable source of trust, which may include manufacturer-signed certificates or hardware-secured vaults. Similarly, a unique derivation path includes any specific mathematical route or index within a hierarchical structure used to identify a sibling unit, which may be seeded by a hardware-derived entropy string from a true random number generator (TRNG), and is broadly understood as any hardware node sharing a common ancestry or root merchant key within a merchant lineage.

The term node gateway, also referred to as a hardware apparatus or Merchant Gateway, encompasses any localized coordination hub, back-office interface, or functional node gateway configured to manage cryptographic communication and lineage-integrity between a persistent ledger and a population of remote hardware nodes. The merchant lineage refers to any cryptographically linked group of hardware nodes, wherein the term "merchant" is used as a non-limiting label for a root authority and does not limit the lineage to commercial or retail applications. The associated lineage archive encompasses any stored database, record, or log containing identifiers for that lineage. A shared root merchant key includes the master cryptographic secret from which sub-keys originate, while a shared derivation branch comprises any specific sub-tree or path within that hierarchy. Furthermore, a lineage-integrity alert represents any cryptographic signal or interrupt indicating a potential security compromise or physical tamper event, which may trigger a revocation event-broadly defined as any administrative or detected trigger that nullifies a node's functional capabilities including active-zeroization of key storage.

A persistent ledger encompasses any non-volatile, distributed, or decentralized record-keeping system, such as a distributed hash table or a blockchain, and a synchronization node includes any functional entity or gatekeeper configured to validate records for that ledger. The permissioning state comprises any data structure or set of flags defining the authorization levels of a node. In the context of external interactions, lineage-agnostic data proxying includes the relaying of data for a guest hardware node, which is any device possessing a root of trust external to the local merchant lineage. This interaction occurs via a zero-trust sequestration-channel, which refers to any encrypted, isolated communication path enforced by a cryptographic logic gap, and utilizes a guest-proxy identifier, encompassing any non-persistent cryptographic token assigned for provisional identification.

The hardware-protected execution environment (HPEE), also referred to as a protected partition, includes any logically or physically isolated processing area or memory segment that ensures the confidentiality of code and data, functioning independently of the primary application processor's operating system. Within this environment, a running-inflow accumulator comprises any monotonic counter or non-decreasing register used to track unit adjustments. The hardware identity of the apparatus encompasses any unique, hardware-bound identifier stored within these isolated zones. During transactions, a peer-to-peer handshake includes any direct communication protocol between nodes, from which a provisional unit commitment—defined as any signed intent to modify a unit value—is extracted. The term unit is defined as a quantized representation of a digital or physical resource, entitlement, temporal increment, or state-increment recorded within non-volatile memory.

The witness-attestation signature encompasses any cryptographic proof generated by an apparatus to provide a secondary validation layer, often binding a commitment to a settlement manifest, which refers to any cryptographically validated record of settled values. A variance parameter includes the calculated difference between local and settled states, and the reconciliation-response routine encompasses any pre-defined logic, such as a self-revocation or soft suspension, executed when this variance exceeds a reconciliation threshold. To facilitate finality, a local nullification signal and a self-authenticating nullification signal include any commands, potentially containing Merkle proofs, used to modify a status byte-broadly defined as any physical or logical register configured with hardware-enforced mutex logic, independent of primary system software, that indicates the finality state of a record.

Temporal integrity is maintained via the master epoch counter, which represents any monotonic temporal reference or ledger-synchronized clock. The temporal-drift parameter includes any measured offset between a local clock state and this master reference, while a drift-velocity parameter encompasses the rate of change of that offset over time. A periodic handshake refers to any recurring synchronization event used to generate a signed epoch-attestation, which includes any packet containing clock-correction commands. These commands are used to reset an internal stale-data timer, comprising any hardware-gated register that disables signing functions upon reaching a defined state.

For localized operations, the local-finality threshold encompasses any risk-based limit or variable threshold used to determine if a transaction can be finalized locally. This threshold may be defined within a merchant-defined risk manifest, which refers to any configurable set of parameters or logic governing hardware behavior. The attested sequestration-confirmation record includes any signed proof indicating a local unit adjustment, and the retrieval-pointer comprises any cryptographic hash or index used to locate a specific event. Finally, an aggregation buffer encompasses any non-volatile memory segment including isolated SRAM partitions or battery-backed MRAM resident within the Node Gateway used for the batch-processing or back-office reconciliation of these records, while asynchronous state-resolution includes any process of finalizing records using deferred data retrieved from a ledger stream.

Having defined the technical terms and functional requirements above, the structural implementation and operative environment of these components will now be described with reference to the accompanying drawings. The following embodiments are provided as non-limiting examples intended to illustrate the principles of the disclosure rather than to restrict the scope of the claims.

Referring to FIG. 1, a Hardware Ecosystem 100 is illustrated comprising a decentralized network of hardware-bound entities configured for cryptographically secured resource management and settlement. The Hardware Ecosystem 100 can be embodied as a distributed infrastructure where a Node Gateway 200 (further illustrated as Hardware Apparatus 200 in FIG. 2) coordinates activity between at least one Sibling Hardware Node A 110 and a Sibling Hardware Node B 114. In a preferred embodiment, the Node Gateway 200 is configured as a Merchant Gateway to facilitate back-office reconciliation and batch-processing for said nodes. These remote hardware entities operate within a specific merchant-lineage and can be configured to establish secure communication with a Remote Synchronization Node 118, which functions as a lineage-aware external gateway for global-ledger batch-recordation. The Remote Synchronization Node 118 can interface with a Persistent Ledger 122, which can be a distributed immutable database that stores permissioning states and settlement manifests. The Hardware Ecosystem 100 further incorporates an External Liquidity Layer 126, which can serve as a capital-commitment system for executing value transfers based on cryptographic proofs generated within the network. To facilitate interoperability with external roots of trust, a Guest Hardware Node 130 can be provided, seeking a zero-trust channel through the Hardware Ecosystem 100 by referencing an External Guest-Registry 134.

The Hardware Ecosystem 100 functions by enforcing silicon-level identity and lineage logic across all participating nodes. Sibling Hardware Node A 110 and Sibling Hardware Node B 114 are configured for peer-to-peer (P2P) synchronization and witness-attestation, allowing for local state transitions even in the absence of connectivity to the Persistent Ledger 122. The Remote Synchronization Node 118 monitors the network state and aggregates local unit-adjustments into settlement batches that are periodically committed to the Persistent Ledger 122. Security can be maintained by requiring that the Guest Hardware Node 130 be validated against the External Guest-Registry 134 via a Registry Interface 242 (see FIG. 2) before a guest-proxy identifier is assigned, ensuring that foreign hardware cannot poison the local merchant-lineage.

In a practical application, a franchise owner or merchant utilizes the Hardware Ecosystem 100 as a multi-store management platform to synchronize 50 local store nodes to a global ledger. In this configuration, the Node Gateway 200 acts as a Merchant Gateway, removing the requirement for a separate bank-run VPN for every terminal, as the hardware-bound identity of each node ensures secure, encrypted data transmission. By deploying the Hardware Ecosystem 100, the merchant maintains operational continuity and math-based trust across geographically dispersed locations, transitioning from the broad network level to the specific internal architecture of an individual Node Gateway 200 (Hardware Apparatus 200) as shown in FIG. 2.

Figure 2:
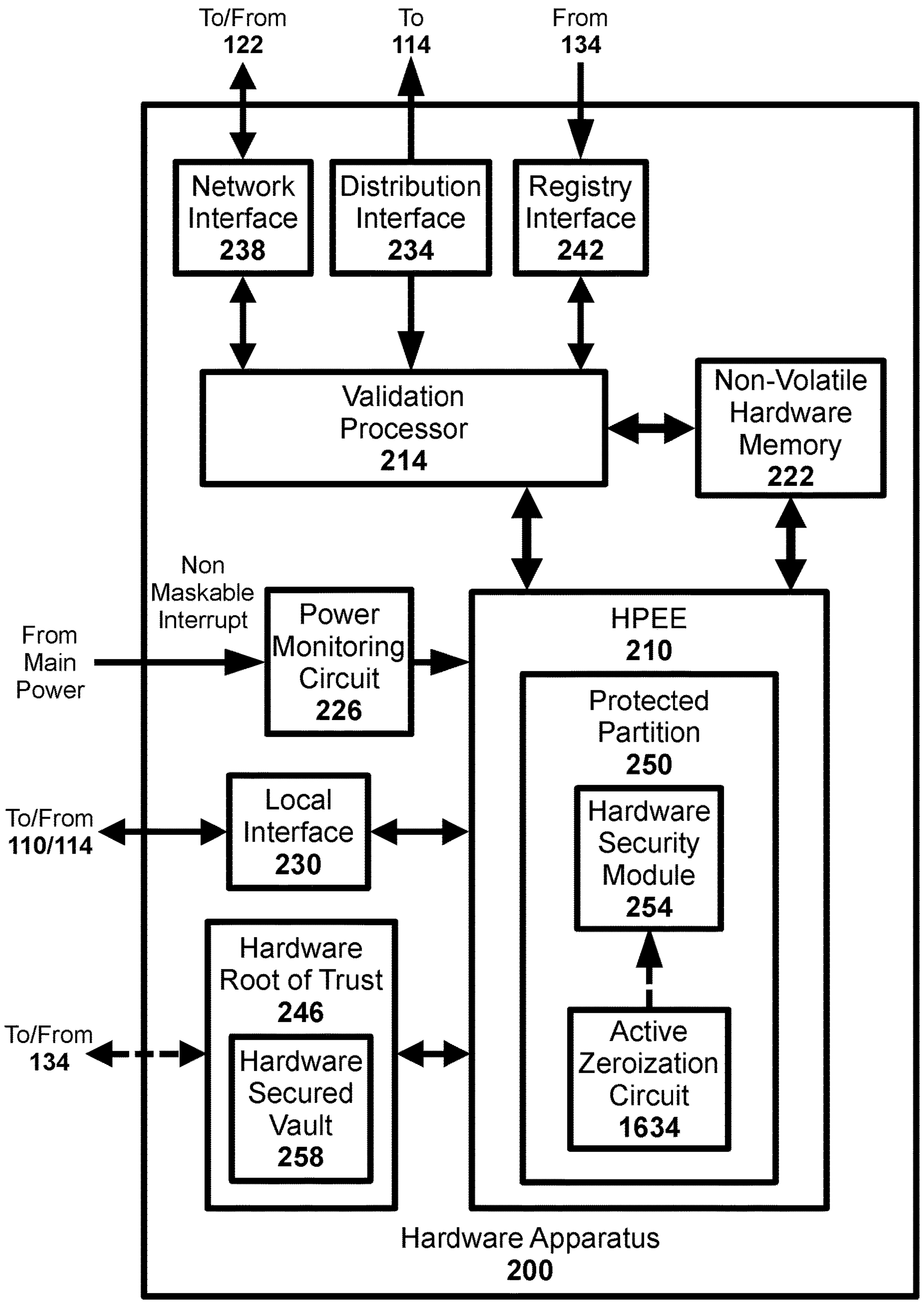
FIG. 2 is a functional block diagram illustrating the internal architecture of a hardware apparatus including a hardware-protected execution environment (HPEE) and a silicon root of trust in accordance with the present disclosure.

Referring to FIG. 2, a Hardware Apparatus 200 is illustrated comprising a multi-layered functional architecture configured for the central management and reconciliation of a decentralized hardware network. The Hardware Apparatus 200 is a Node Gateway embodied as a physical controller or gateway housing a Hardware-Protected Execution Environment (HPEE) 210 for isolated cryptographic operations and local finality. A Validation Processor 214 is provided as the primary logic unit and is configured as a hard-wired circuit to drive an Administrative Interface 2000 (see FIG. 20) and monitor for manual override interrupts. The Validation Processor 214 and the HPEE 210 can communicate via a Secure Local Data Bus 218 (not shown), which comprises a shielded internal electrical pathway that further interconnects with a Non-Volatile Hardware Memory 222 for the storage of merchant-lineage archives and transaction aggregation-buffers. A Power-Monitoring Circuit 226 is incorporated as a hardware voltage-comparator for detecting voltage fluctuations and triggering a non-maskable interrupt (NMI) to the HPEE 210 to execute atomic state-commitments to the Non-Volatile Hardware Memory 222 during power instability.

The Hardware Apparatus 200 facilitates communication through a plurality of specialized hardware assemblies. A Local Interface 230 comprises a short-range wireless or physical transceiver for secure peer-to-peer proximity sessions with remote nodes. A Distribution Interface 234 is provided for transmitting nullification signals and epoch-attestations, while a Network Interface 238 enables communication with external ledgers and global-stream monitoring. For the ingestion of attested identity records, a Registry Interface 242 is coupled to the Validation Processor 214.

The cryptographic integrity of the Hardware Apparatus 200 is anchored by a Hardware Root of Trust (RoT) 246, which is a silicon-bound component containing manufacturer-signed certificates and is configured to interface with an external Origin-Authority to validate its own identity records. The HPEE 210 further defines a Protected Partition 250, which comprises a secure hardware-gated memory segment for master root keys and epoch counters. Within this partition, a Hardware Security Module (HSM) 254 is provided for the dedicated isolation of a Master Root Merchant Key 310 (see FIG. 3). The Protected Partition 250 is physically isolated from the Network Interface 238 and Distribution Interface 234 to establish a hardware-enforced logic gap. The Protected Partition 250 further incorporates an Active-Zeroization Circuit 1634 (see FIG. 16) comprising a voltage-dump trigger configured to physically ground or destroy key storage upon a catastrophic variance, such as a physical breach or cryptographic failure threshold verified within the HPEE 210 logic. Additionally, a Hardware-Secured Vault 258 is utilized for high-integrity protective credential storage within the RoT 246.

In a practical application, a merchant utilizes the Hardware Apparatus 200 as a Merchant Gateway to enforce terminal integrity through rigorous hardware attestation. Before a cashier can sign onto a handheld terminal, the Merchant Gateway utilizes the Hardware Root of Trust 246 to verify a device quote provided by the terminal, ensuring the device has not been rooted or tampered with to skim customer data. This verification process relies on the isolated logic within the Protected Partition 250 to validate the terminal's state before allowing it to join the active merchant-lineage. By establishing this hardware-level trust, the merchant transitions from the general assembly of the apparatus to the specific hierarchical structures governed by a Lineage Logic Engine 300 as shown in FIG. 3.

Figure 3:
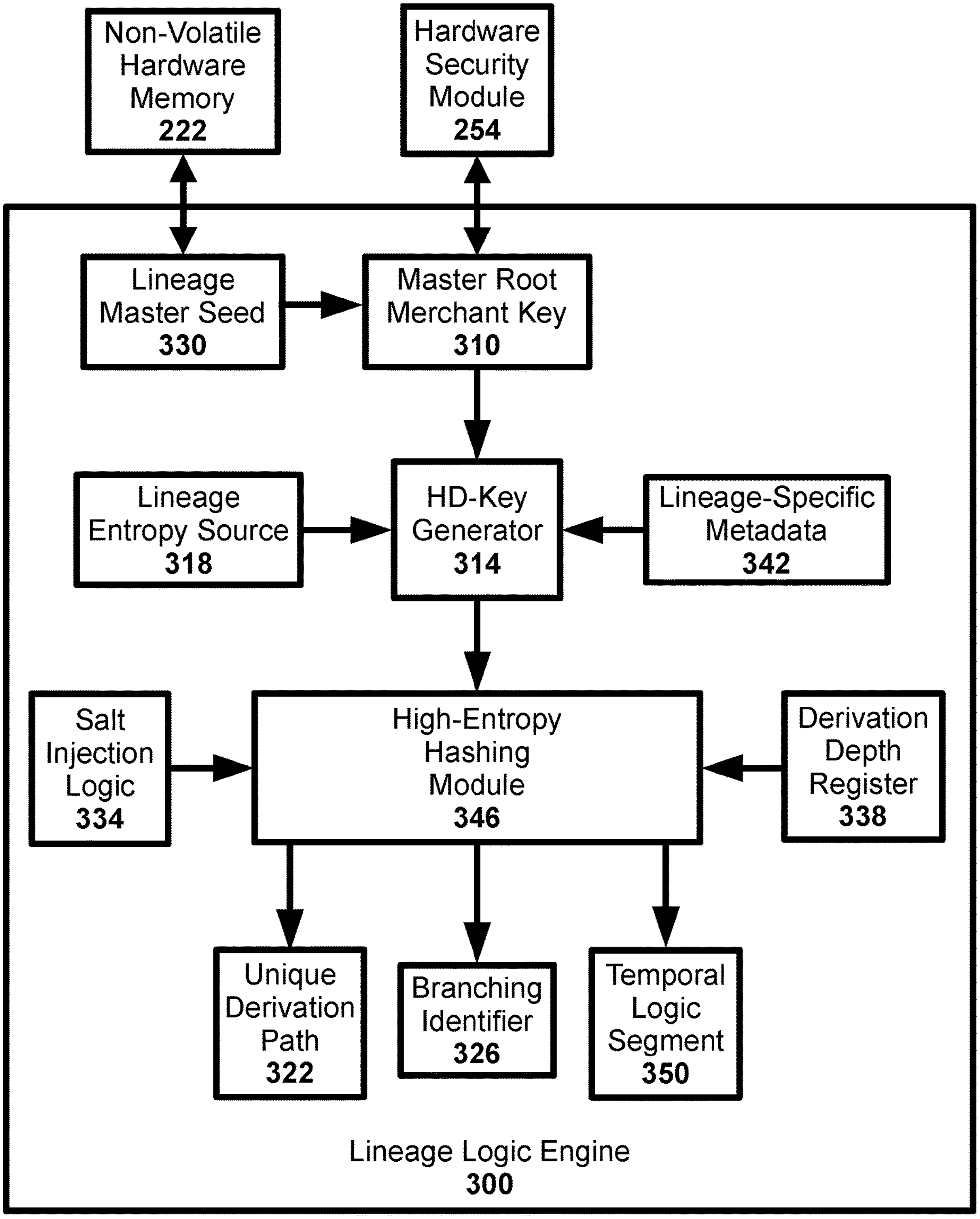
FIG. 3 is a block diagram illustrating a lineage logic engine for generating a master merchant root key and unique derivation paths in accordance with the present disclosure.

Referring to FIG. 3, a Lineage Logic Engine 300 is illustrated as a dedicated hardware environment within the HPEE 210 (see FIG. 2) configured for managing Hierarchical Deterministic (HD) key structures and ensuring silicon-level isolation between network branches. The Lineage Logic Engine 300 can be anchored by a Master Root Merchant Key 310, which serves as the primary non-exportable cryptographic secret stored within the secure key storage of the HSM 254 (see FIG. 2). To facilitate the creation of sub-lineages, an HD-Key Generator 314 is provided as a dedicated logic circuit configured to execute one-way functions. The HD-Key Generator 314 can utilize entropy provided by a Lineage Entropy Source 318, which can be a physical True Random Number Generator (TRNG) circuit. This entropy, combined with Lineage-Specific Metadata 342, ensures that a merchant's cryptographic footprint remains unique and isolated.

The derivation of specific hardware identities is governed by a Unique Derivation Path 322, which maps a specific node or sub-set of nodes to a lineage. A Branching Identifier 326 can be utilized as a cryptographic tag to group sub-sets of nodes, such as department-specific terminals. The Lineage Logic Engine 300 further incorporates Salt-Injection Logic 334 and a High-Entropy Hashing Module 346 to harden the derivation function against pre-computation attacks. A Derivation-Depth Register 338 can be provided as a hardware register to track the hierarchical distance from the root, while a Temporal Logic Segment 350 can be configured to rotate keys based on defined temporal cycles. For disaster recovery and state restoration, a Lineage Master Seed 330 is maintained as a persistent anchor within the Non-Volatile Hardware Memory 222 (see FIG. 2).

In a practical application, the Lineage Logic Engine 300 enables strict department isolation within a retail environment. For example, a department store can derive a specific "Branch" for a jewelry counter, represented by a unique Branching Identifier 326. This configuration limits the high-value transaction authority of nodes within that specific branch compared to those in a food court lineage. By utilizing the HD-Derivation Mask logic, a Quarantine-Radius Logic 918 (see FIG. 9) can apply a bit-mask to the Branching Identifier 326 to zeroize specific branching bits, effectively isolating the high-value department without affecting the rest of the ecosystem. This architectural separation ensures that a compromise in one service area does not horizontally migrate to others, transitioning the focus from cryptographic structure to the functional process of node enrollment as shown in FIG. 4.

Figure 4:
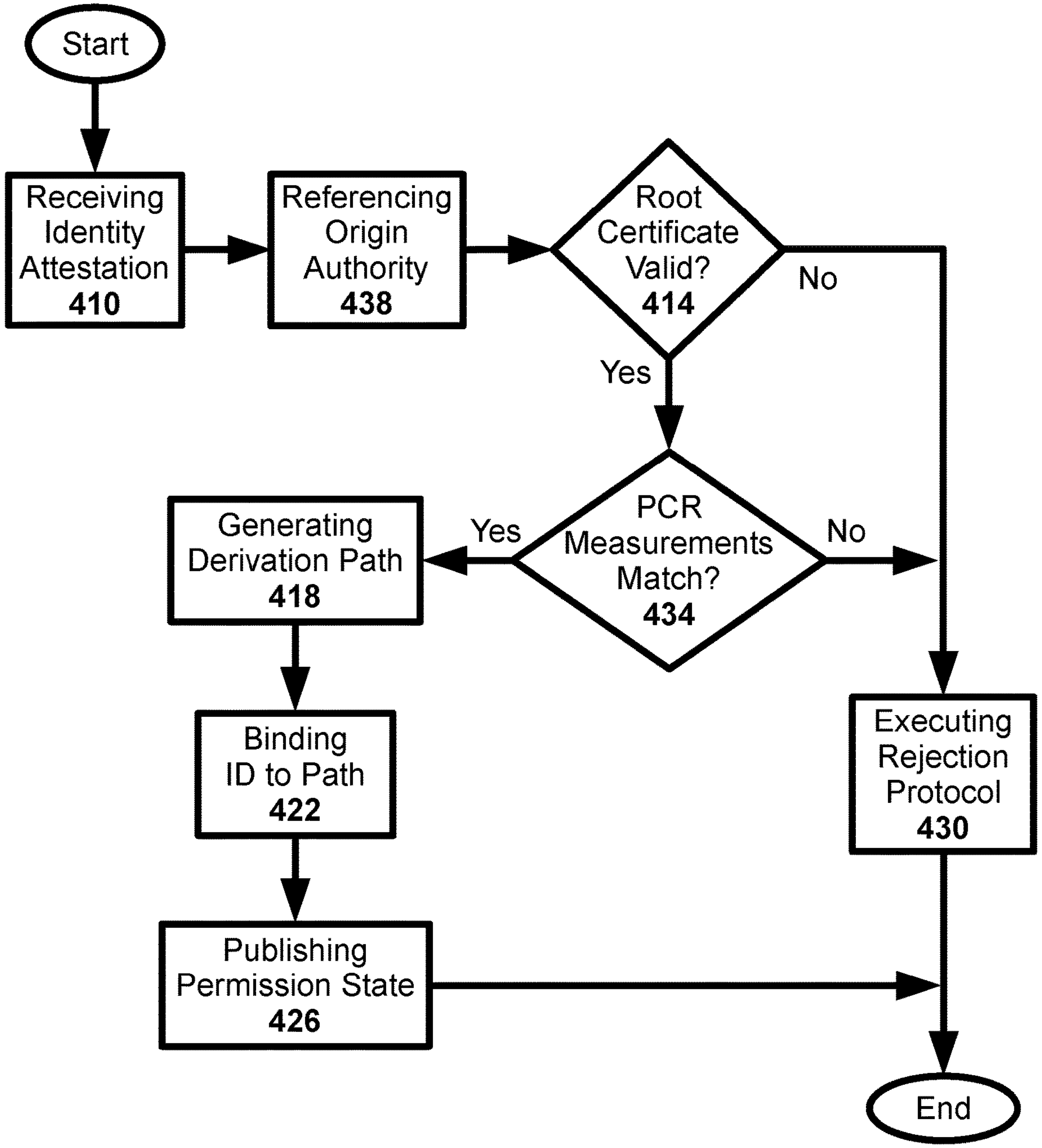
FIG. 4 is a flowchart illustrating a method for hardware-node lifecycle management and identity attestation against a hardware root of trust in accordance with the present disclosure.

Referring to FIG. 4, a flowchart is illustrated representing an enrollment and identity attestation routine managed by the Validation Processor 214 (see FIG. 2) to onboard remote hardware into the Hardware Ecosystem 100 (see FIG. 1). The routine begins by Receiving at step 410 the Identity Attestation, which comprises a hardware-bound identity package and an Attested Identity Record 1638 (see FIG. 16) captured from a remote node via the Registry Interface 242 (see FIG. 2).

The process identifies whether the Root Certificate is Valid at step 414 by the Validation Processor 214 executing a binary check of the hardware root of trust against a manufacturer's public key. This check involves Referencing at step 438 the Origin-Authority, which comprises an external manufacturer-signed cryptographic anchor, to validate the hardware identity records stored within the Hardware-Secured Vault 258 (see FIG. 2). In the event the certificate fails validation, the routine branches to Executing at step 430 the Rejection Protocol, which inhibits node enrollment and flags the identifier for silicon-lineage failure within the Non-Volatile Hardware Memory 222 (see FIG. 2).

Where the root certificate is confirmed as valid, the routine proceeds to verify whether the PCR Measurements Match at step 434. This stage requires the Validation Processor 214 to evaluate platform configuration registers against a verified boot state stored in the PCR Reference Register 1642 (see FIG. 16) to ensure the remote software environment is untampered. If the measurements do not match the expected "golden state," the routine branches to Executing at step 430 the Rejection Protocol. If the measurements match, the routine advances to Generating at step 418 the Derivation Path by the HD-Key Generator 314 (see FIG. 3) to assign the node a specific position in the merchant lineage.

Figure 9:
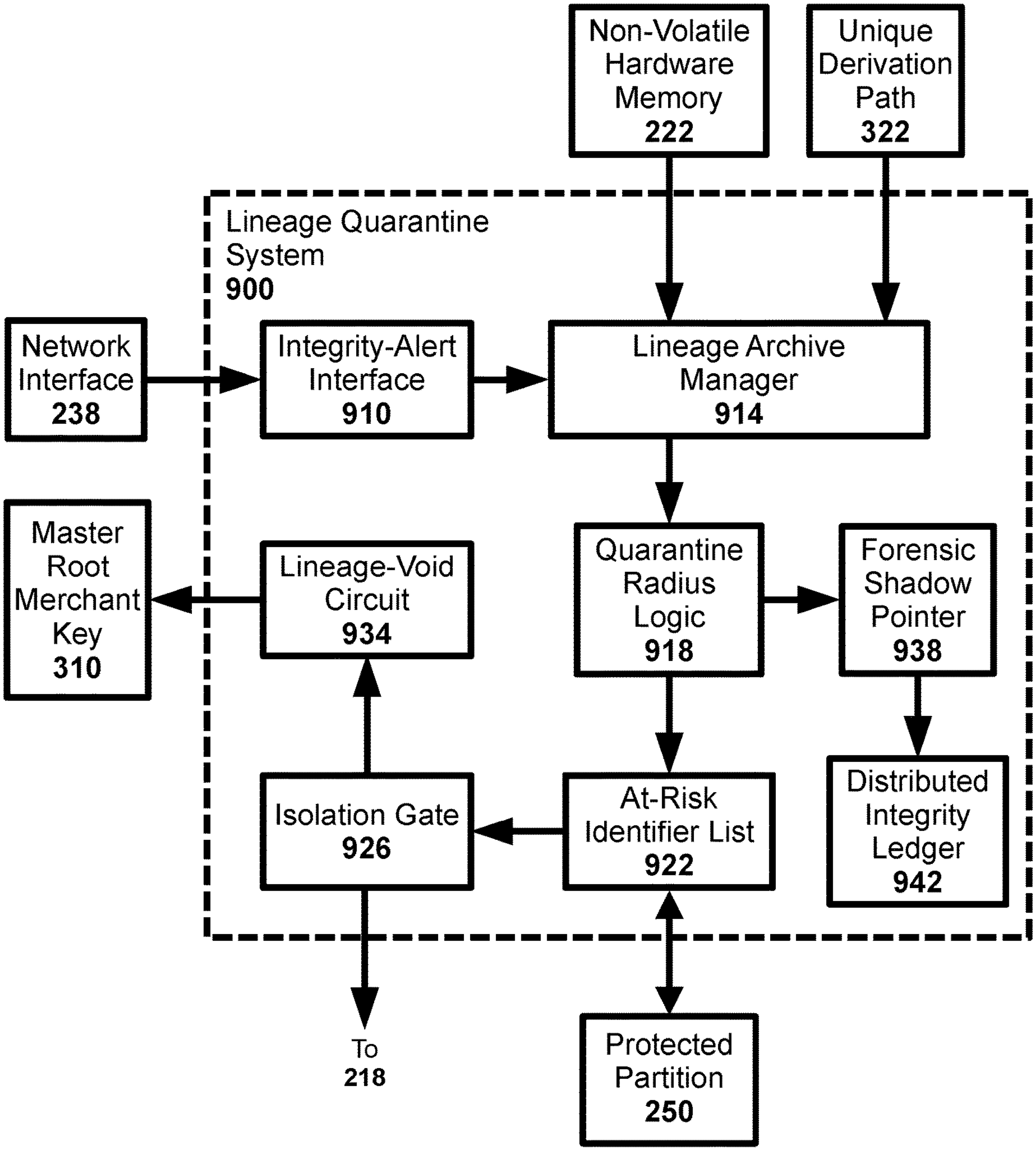
FIG. 9 is a block diagram illustrating a lineage quarantine system for identifying at-risk sibling hardware identifiers and calculating quarantine radii in accordance with the present disclosure.

The routine continues by Binding at step 422 the ID to the Path, which couples the node's unique hardware identity to the generated Unique Derivation Path 322 (see FIG. 3) within the lineage archive managed by the Lineage Archive Manager 914 (see FIG. 9). The process concludes by Publishing at step 426 the Permission State, wherein the Validation Processor 214 transmits the authorization record, the Hardware-Enforced Timestamp 1138 (see FIG. 11), and associated lineage metadata to the Persistent Ledger 122 (see FIG. 1) via the Remote Synchronization Node 118 (see FIG. 1).

In a practical application, a merchant utilizes this routine to securely onboard a new pop-up terminal at a remote event, such as a music festival or a temporary trade booth, where the risk of hardware tampering or local data-theft is high. Rather than relying on a simple password or a cloud-login that could be spoofed, the gateway initiates a physical interrogation of the terminal to ensure it is the exact piece of silicon authorized for that lineage. The apparatus verifies the terminal physical silicon identity and software integrity by checking its boot-state against a manufacturer-signed certificate, effectively confirming that the device has not been loaded with malware or a modified operating system designed to skim customer data.

Once this silicon-level trust is established, the gateway binds the device to a restricted branch of the merchant cryptographic tree. This ensures the new device can process transactions and sign commitments in the field while remaining mathematically isolated; even if the pop-up terminal is physically stolen or its casing is breached, the attacker cannot gain unauthorized access to the Master Root Merchant Key 310 (see FIG. 3) or jeopardize the security of other registers back at the main storefront. This establishment of a verified, sandboxed identity provides the merchant with the operational confidence to deploy hardware in unsecured environments, allowing the apparatus to then monitor the node temporal health and synchronization status as shown in FIG. 5.

Figure 5:
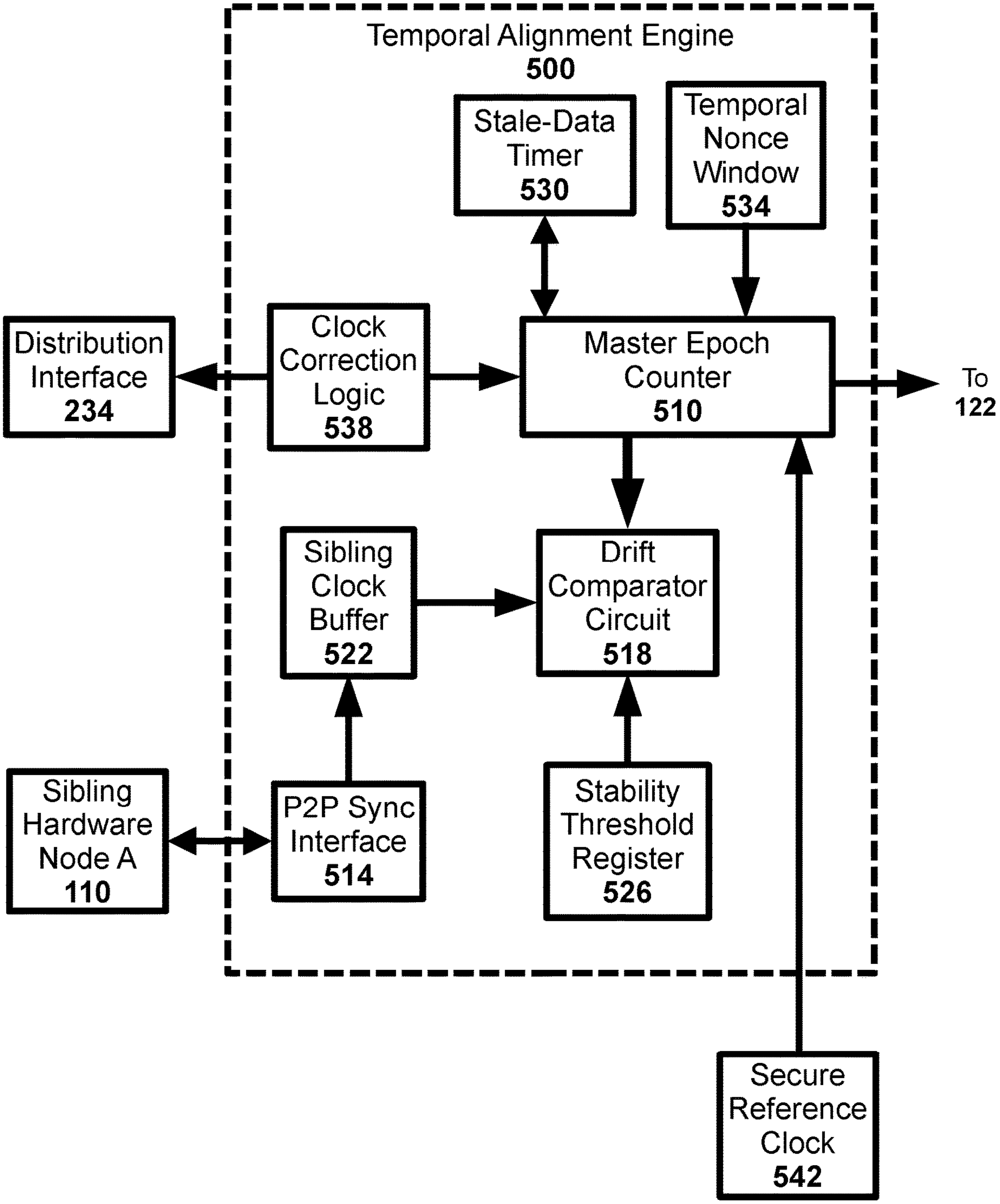
FIG. 5 is a functional block diagram illustrating a temporal alignment engine for calculating temporal-drift parameters and managing a master epoch counter in accordance with the present disclosure.

Referring to FIG. 5, a block diagram is illustrated representing a Temporal Alignment Engine 500 and its associated hardware logic for managing chronological integrity within the Hardware Ecosystem 100 (see FIG. 1). The Temporal Alignment Engine 500 is integrated within the HPEE 210 (see FIG. 2) of the Node Gateway 200 and is governed by a Master Epoch Counter 510, which serves as the central monotonic hardware source of truth for the apparatus and is initialized via a Secure Reference Clock 542 input to maintain absolute accuracy. The Master Epoch Counter 510 is configured as a hardware-gated internal clock source that maintains relative monotonic integrity independent of the connectivity status of the Persistent Ledger 122. This counter is electrically coupled to a Temporal-Nonce Window 534, providing a logic circuit to synchronize attestations and prevent the injection of asynchronous or replayed records.

The hardware sub-system utilizes a P2P Sync Interface 514 to establish secure proximity sessions with Sibling Hardware Node A 110 (see FIG. 1). During a synchronization event, the Sibling Clock Buffer 522-*a* volatile hardware memory segment-temporarily holds the timestamp received from the remote node. This value is processed by the Drift Comparator Circuit 518, which calculates the numerical difference between the Master Epoch Counter 510 and the value in the Sibling Clock Buffer 522. The resulting drift value is evaluated against a Stability-Threshold Register 526, which stores the maximum allowable temporal variance before a node is quarantined. The Stability-Threshold Register 526 is pre-loaded with a hardware tolerance offset corresponding to the silicon oscillator tolerance of the Node Gateway 200 to distinguish natural hardware drift from malicious clock-manipulation.

To ensure fail-safe operations, the engine incorporates a Stale-Data Timer 530, functioning as an internal hardware watchdog circuit within the HPEE 210. This timer is a monotonic counter with a hardware-enforced maximum duration that triggers a node-lock if a synchronization heartbeat is missed, independent of external network signals. Furthermore, the Clock-Correction Logic 538 is provided to embed the current master epoch value into a signed attestation message for transmission via the Distribution Interface 234 (see FIG. 2). This architecture ensures the apparatus maintains a localized time-fortress that governs the permissioning state of all derived siblings independently of external cloud clocks.

In a practical application, the Temporal Alignment Engine 500 enables an offline shift-sync capability during an 8-hour internet outage. The Merchant Gateway keeps the Master Epoch Counter 510 moving autonomously, allowing local terminals to continue processing and signing transactions against the internal hardware clock. Because the terminals are bound to this local source of truth, they do not stop working due to an unreachable cloud clock, ensuring business continuity until connectivity is restored for a global ledger update. This localized temporal control establishes the required synchronization baseline for executing the periodic maintenance routines shown in FIG. 6.

Figure 6:
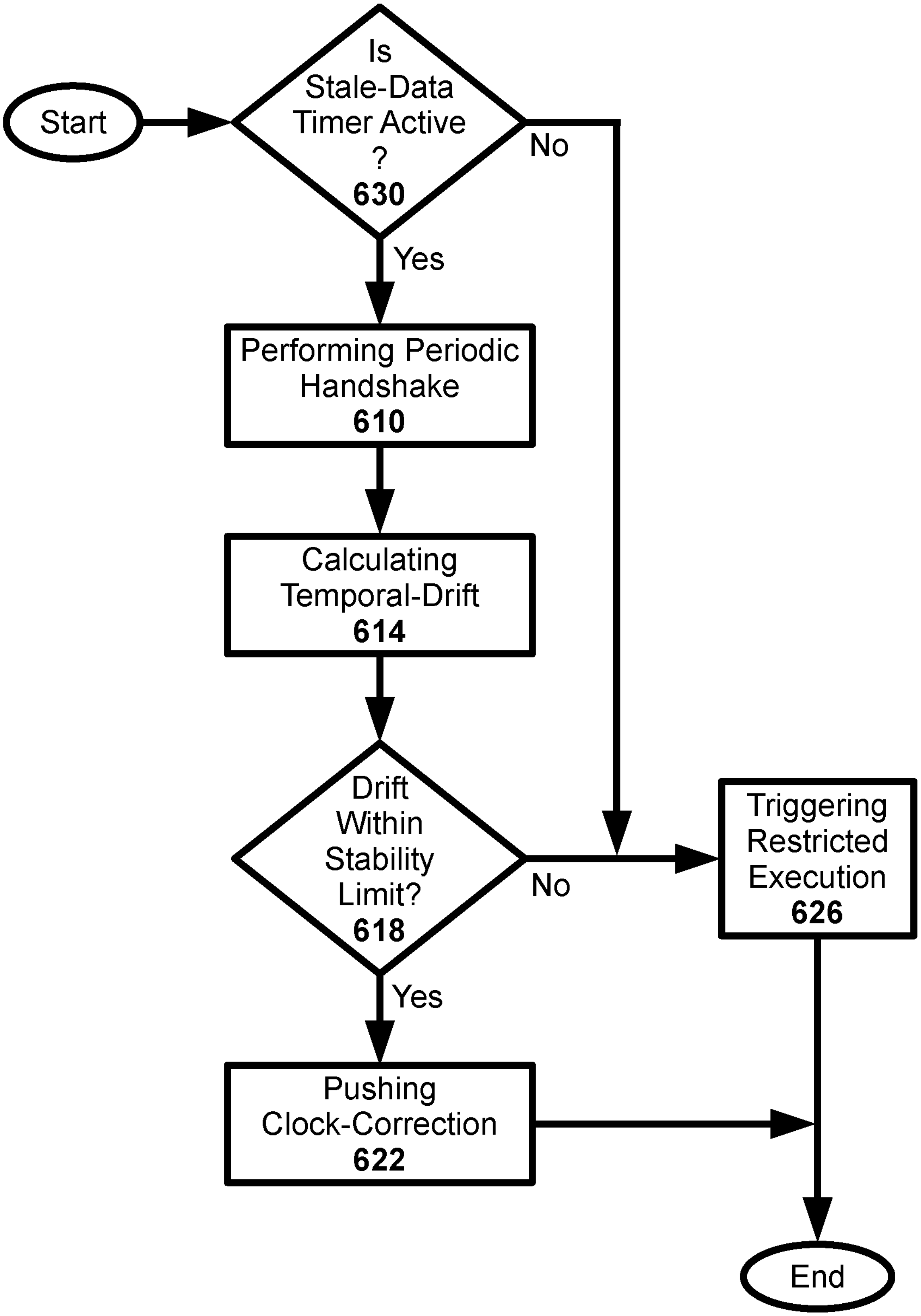
FIG. 6 is a flowchart illustrating a method for temporal alignment including resetting a stale-data timer via a signed epoch-attestation in accordance with the present disclosure.

Referring to FIG. 6, a flowchart is illustrated representing a Sibling Maintenance Routine 1800 executed by the apparatus to regulate temporal and cryptographic integrity across the Hardware Ecosystem 100 (see FIG. 1). The routine begins by determining if the Stale-Data Timer is Active at step 630. This binary check evaluates whether the node has failed to perform a valid handshake within the grace period defined by the HPEE 210 (see FIG. 2). If the Stale-Data Timer 530 is no longer active, the routine branches to step 626 to terminate the node's authority.

Where the Stale-Data Timer 530 is confirmed as active, the routine proceeds to Performing at step 610 a Periodic Handshake, wherein the P2P Sync Interface 514 (see FIG. 5) initiates a secure proximity session to exchange monotonic clock states with a sibling node, such as Sibling Hardware Node A 110 (see FIG. 1). This handshake acts as the primary hardware heartbeat required to maintain the node's active permissioning state.

The routine proceeds to Calculating at step 614 the Temporal-Drift by utilizing the Drift Comparator Circuit 518 (see FIG. 5) to quantify the numerical variance between the sibling's reported timestamp and the Master Epoch Counter 510 (see FIG. 5). The process then determines if the Drift is Within Stability Limit at step 618 through a binary check against the Stability-Threshold Register 526 (see FIG. 5). If the calculated drift exceeds the hardware-defined threshold, indicating a potential manipulation or prolonged disconnection, the routine branches to Triggering at step 626 a Restricted Execution state. This state transmits a lock-instruction to the sibling node and engages the Stale-Data Timer 530 (see FIG. 5) to inhibit further transaction processing.

If the temporal drift is within acceptable limits, the routine advances to Pushing at step 622 a Clock-Correction, transmitting a hardware-signed epoch-attestation via the Clock-Correction Logic 538 (see FIG. 5) to reset the internal timer of the sibling. Following the clock-correction, the routine returns to the entry gate at step 630 to verify continued timer activity.

In a practical application, the Sibling Maintenance Routine 1800 provides proximity security for distributed retail environments. For example, a manager's tablet serving as the master apparatus handshakes with a register (a sibling node) via the local interface. The Drift Comparator 518 ensures the register hasn't been out of contact so long that its internal security certificates are stale or its local clock has been tampered with to facilitate back-dated transaction injection. By requiring this physical proximity and temporal alignment, the gateway prevents a stolen or compromised register from functioning indefinitely in isolation, ensuring that every sibling remains tethered to the apparatus's central source of truth. This localized temporal health check ensures the accuracy of the unit-value data before it is processed by the reconciliation logic shown in FIG. 7.

Figure 7:
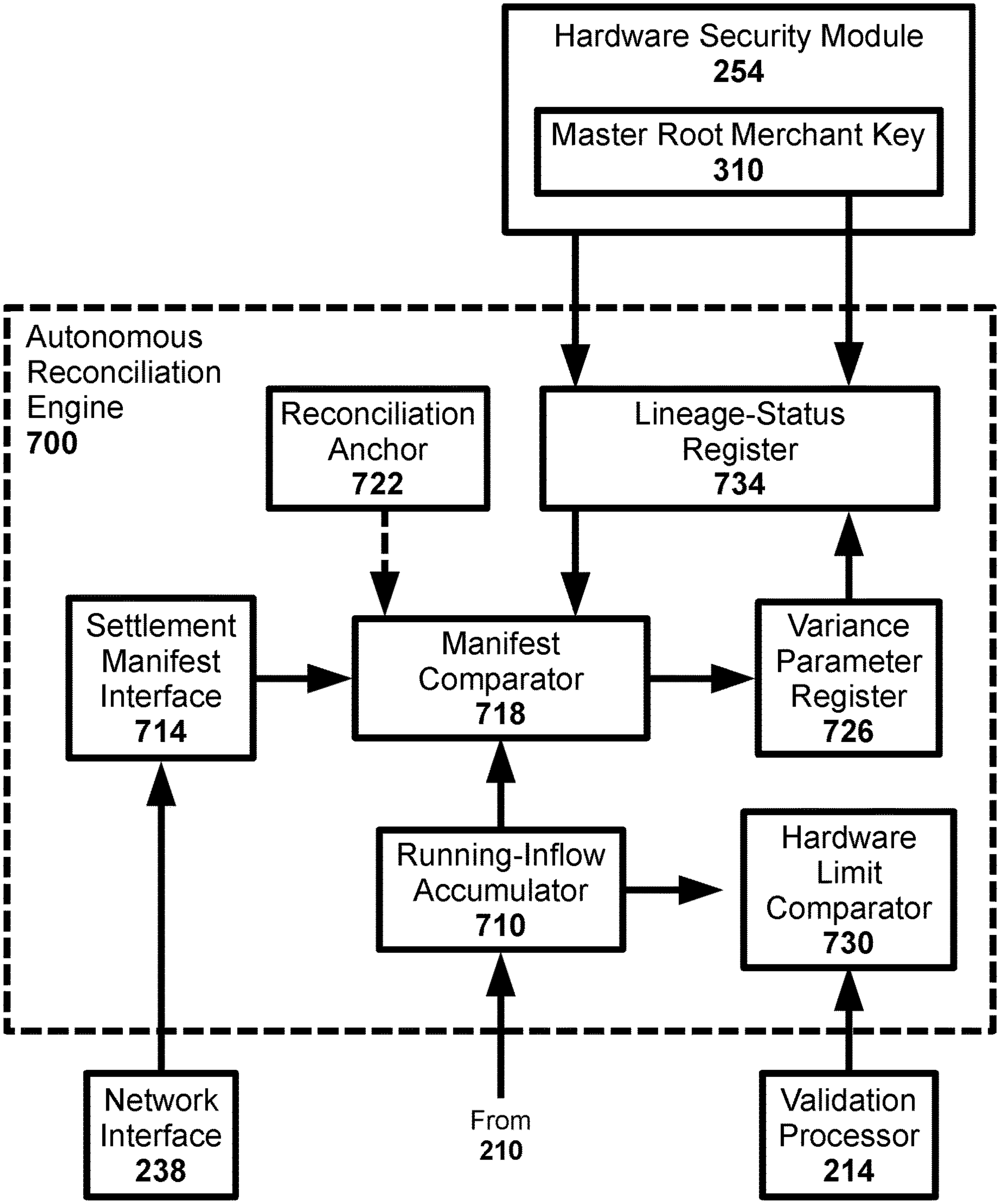
FIG. 7 is a functional block diagram illustrating an autonomous reconciliation engine comprising a running-inflow accumulator and settlement manifest interface in accordance with the present disclosure.

Referring to FIG. 7, a block diagram is illustrated representing an Autonomous Reconciliation Engine 700 configured for auditing unit-value adjustments and maintaining lineage integrity within the Hardware Apparatus 200 (see FIG. 2). The Autonomous Reconciliation Engine 700 comprises a Running-Inflow Accumulator 710, which is a hardware-protected counter residing within the HPEE 210 (see FIG. 2) for tracking cumulative total unit-value adjustments processed by the node population. This accumulator is electrically coupled to a Manifest Comparator 718, which serves as a hard-wired logic circuit for calculating the numerical difference between the locally accumulated units and finalized settlement values.

The system ingests external settlement data via a Settlement Manifest Interface 714, which is a hardware subassembly configured to receive finalized settlement records from the Persistent Ledger 122 (see FIG. 1) routed through the Network Interface 238 (see FIG. 2). To ensure the integrity of the audit, the engine utilizes a Reconciliation-Anchor 722, a hardware-signed data structure that binds the local state-sum to a specific ledger depth, stored within the Hardware Security Module 254 (see FIG. 2). Any calculated discrepancy between the manifest and the accumulator is written to a Variance-Parameter Register 726, providing a volatile memory segment for real-time threshold evaluation by the Manifest Comparator 718.

Further integrity is enforced by a Hardware-Limit Comparator 730, which is electrically coupled to the Running-Inflow Accumulator 710 to evaluate inflow totals against a pre-set limit independent of ledger manifests to prevent catastrophic overflow. The engine also monitors a Lineage-Status Register 734, a physical hardware flag electrically coupled to the Hardware Security Module 254 (see FIG. 2) indicating the health or revocation state of the Master Root Merchant Key 310 (see FIG. 3). As specified in the enablement requirements, the Validation Processor 214 (see FIG. 2) is hard-wired to evaluate these inflow totals against the HPEE 210 thresholds, ensuring that any deviation beyond established safety parameters triggers an immediate hardware-level response.

In a practical application, a merchant utilizes the Autonomous Reconciliation Engine 700 to perform an end-of-day audit that functions even if the primary accounting servers are unavailable. The gateway compares the Running-Inflow Accumulator 710, representing what the remote terminals reported as sold, against the Settlement Manifest Interface 714, representing what the ledger actually cleared, to find discrepancies. This autonomous comparison allows the apparatus to verify that every unit of value processed by the sibling nodes is accounted for on the immutable ledger before resetting the local baseline for the next operational cycle. This verification of accumulated value is a prerequisite for the lineage-protection protocols and self-revocation logic described in FIG. 8.

Figure 8:
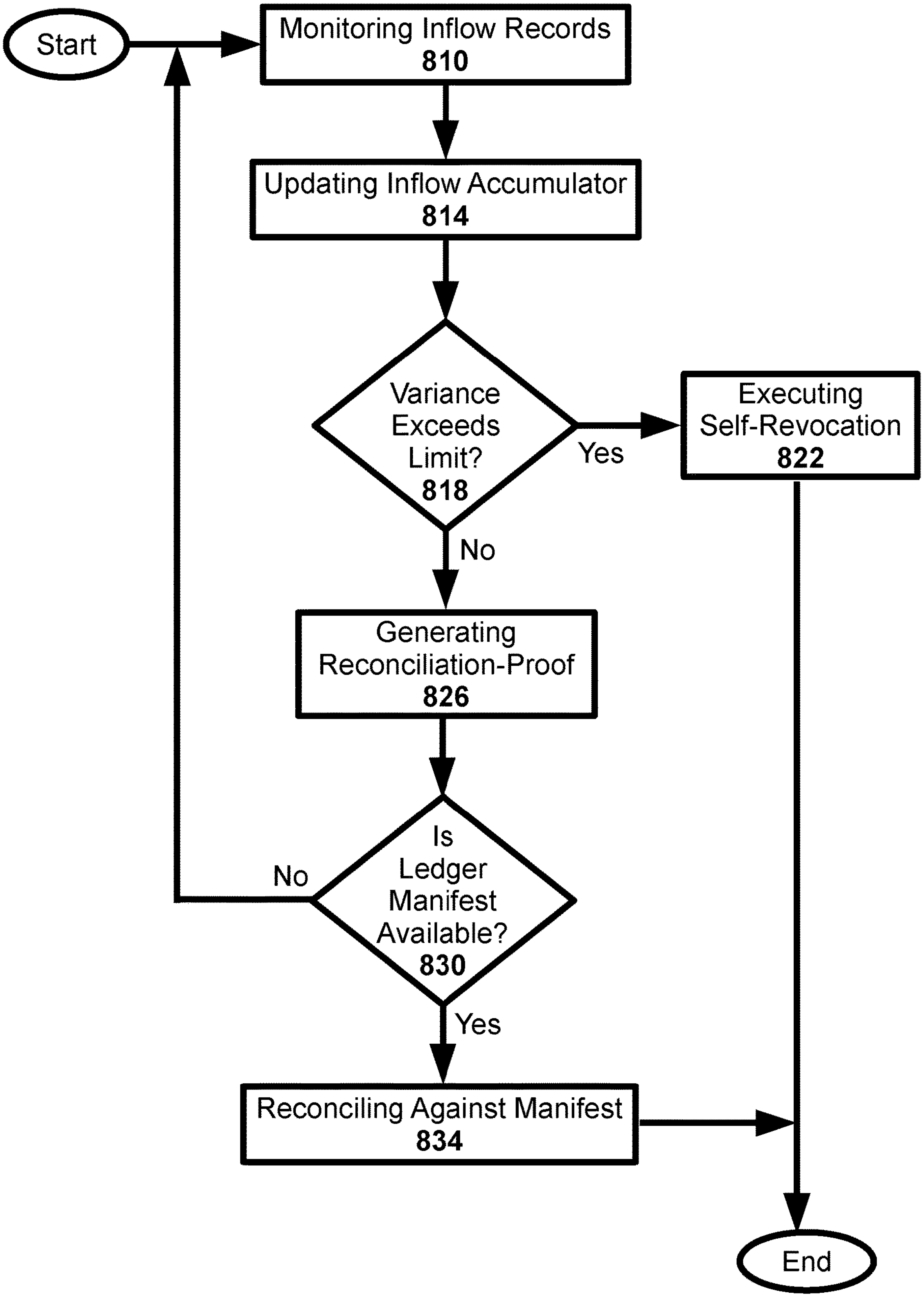
FIG. 8 is a flowchart illustrating a method for value auditing and self-revocation of a master merchant root key in accordance with the present disclosure.

Referring to FIG. 8, a flowchart is illustrated representing the logic executed by the Autonomous Reconciliation Engine 700 (see FIG. 7) to maintain value integrity across the lineage. The routine begins with Monitoring at step 810 the Inflow Records, wherein the Validation Processor 214 (see FIG. 2) captures unit-adjustment messages from the sibling node population via the Local Interface 230 (see FIG. 2). These records are processed at Updating at step 814 the Inflow Accumulator, which increments the Running-Inflow Accumulator 710 (see FIG. 7) within the isolated environment of the HPEE 210 (see FIG. 2). This accumulation represents the real-time physical state of value adjustments captured locally by the hardware.

The routine then triggers a critical security check to determine if the Variance Exceeds Limit at step 818, where the Manifest Comparator 718 (see FIG. 7) evaluates the delta between the accumulated units in the Running-Inflow Accumulator 710 and the expected state stored in the Variance-Parameter Register 726 (see FIG. 7). If the discrepancy is within allowable thresholds, the engine proceeds to Generating at step 826 the Reconciliation-Proof, creating a hardware-attested certificate of the cumulative unit-summation signed by the HSM 254 (see FIG. 2).

The routine then branches based on whether the Ledger Manifest is Available at step 830 via the Settlement Manifest Interface 714. If a manifest is retrieved, the system moves to Reconciling at step 834 against the Manifest, resetting the local accumulator to the verified ledger-finalized state. If the manifest is unavailable at step 830, the routine loops back to Monitoring at step 810 to continue tracking inflows against the current baseline.

However, if the variance at step 818 is found to exceed the stability threshold, the apparatus identifies a catastrophic integrity failure and moves directly to Executing at step 822 the Self-Revocation. This triggers the Active-Zeroization Circuit 1634 (see FIG. 16), which physically and irreversibly destroys the Master Merchant Root Key 310 (see FIG. 3) within the HSM 254 (see FIG. 2), effectively terminating the entire merchant lineage to prevent further value leakage.

In a practical application, a merchant utilizes this routine as an automated fraud detection and containment system for a distributed fleet of terminals. For example, if a specific terminal at a retail location reports $100 in sales but the gateway sees $150 in units gone, the Variance Parameter triggers a lineage alert to the merchant administrative dashboard. Rather than waiting for a manual end-of-day audit, the gateway recognizes the $50 discrepancy in real-time as a potential exploit. In extreme cases where the variance suggests a systemic breach, the hardware can autonomously sever its own cryptographic roots, ensuring that a single compromised terminal cannot be used to siphon value from the broader hardware ecosystem, which then sets up the targeted isolation of the affected branch via the Lineage Quarantine System shown in FIG. 9.

Referring to FIG. 9, a block diagram is illustrated representing a Lineage Quarantine System 900 configured for the identified isolation of compromised derivation branches within the Hardware Ecosystem 100 (see FIG. 1). The system comprises an Integrity-Alert Interface 910 providing the hardware assembly for receiving compromise notifications from the ledger or peer nodes via the Network Interface 238 (see FIG. 2). This interface is electrically coupled to the Lineage Archive Manager 914, which contains the logic for traversing the HD-tree stored in the Non-Volatile Hardware Memory 222 (see FIG. 2) to retrieve and map sibling relationships based on the Unique Derivation Path 322 (see FIG. 3).

The system further includes Quarantine-Radius Logic 918, a dedicated circuitry for calculating the hierarchical depth of isolation required within the lineage tree. This logic facilitates the population of the At-Risk Identifier List 922, a secure memory segment within the Protected Partition 250 (see FIG. 2) used for storing quarantined node IDs. Access control is enforced by the Isolation Gate 926, a hardware logic component electrically coupled to the At-Risk Identifier List 922 that inhibits communication or value-transfer for any node on the at-risk list. For cases requiring terminal intervention, the system utilizes a Lineage-Void Circuit 934 to provide the hardware trigger for the irreversible invalidation of an entire derivation branch, while a Forensic Shadow Pointer 938 tracks compromised activity for subsequent reporting to the Distributed Integrity Ledger 942.

In a practical application, a merchant utilizes this routine as a targeted shutdown mechanism to maintain business continuity during a security event. For example, if a merchant hears of a hardware exploit affecting one specific model of terminal, they use the Quarantine-Radius Logic 918 to identify and isolate only that model branch while the other registers keep ringing up sales. This surgical isolation ensures that a local hardware flaw does not force a total network shutdown, effectively sandboxing the risk to a specific subset of the fleet while the merchant coordinates a hardware-signed alert to the network as part of the broader recovery sequence. By establishing these secure isolation boundaries, the apparatus provides the necessary hardware state for the automated detection and propagation logic of the Sibling Isolation Routine shown in FIG. 10.

Figure 10:
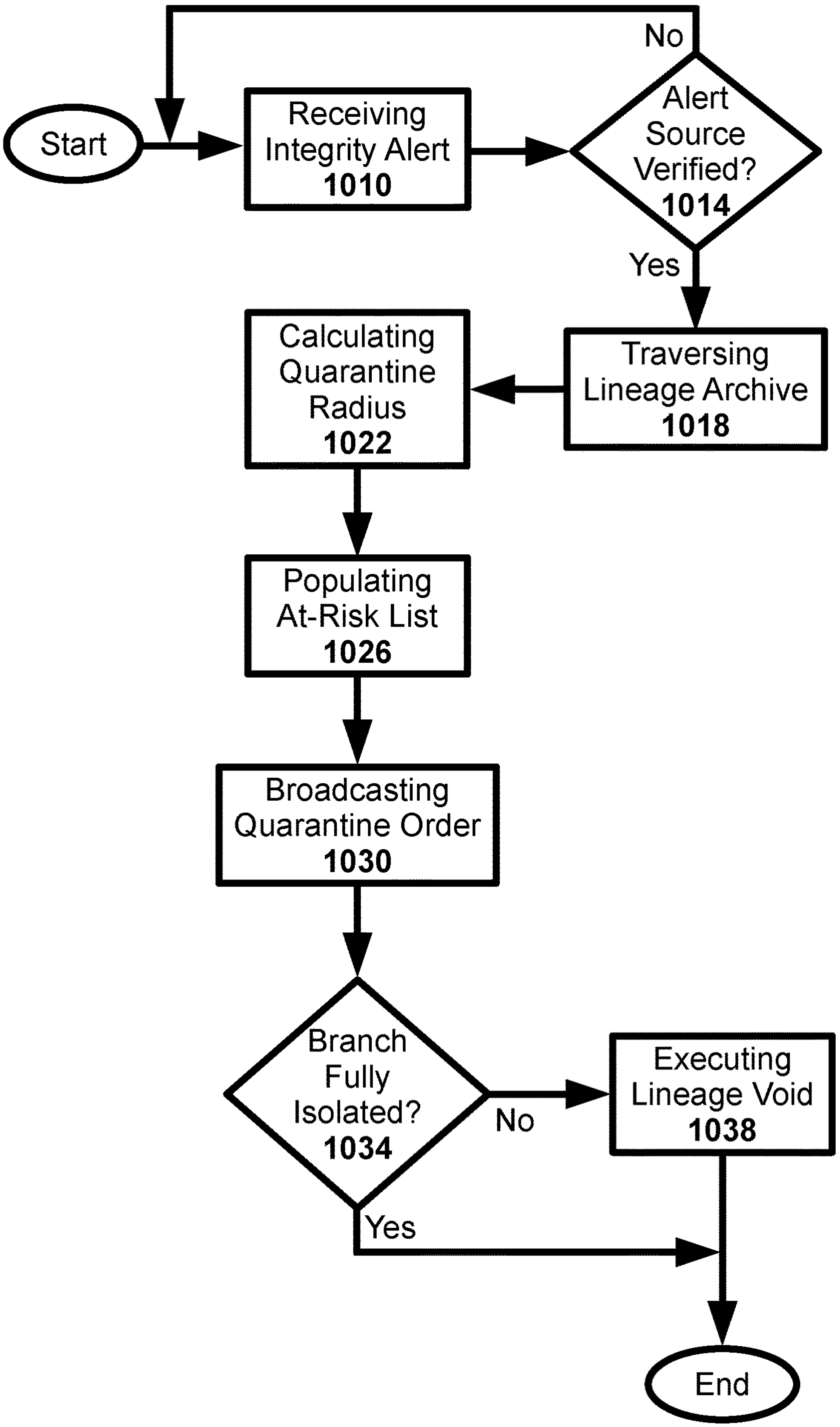
FIG. 10 is a flowchart illustrating a method for threat isolation including traversing a lineage archive and executing a lineage void in accordance with the present disclosure.

Referring to FIG. 10, a flowchart is illustrated representing the logic executed by the Hardware Apparatus 200 (see FIG. 2) to perform targeted branch isolation through the Lineage Quarantine System 900 (see FIG. 9). The routine begins with Receiving at step 1010 the Integrity Alert via the Integrity-Alert Interface 910, which detects an automated tamper signal or a compromise notification. The routine then branches based on whether the Alert Source is Verified at step 1014. If the cryptographic signature or authority of the alert fails the verification against the Hardware Root of Trust 246 (see FIG. 2), the routine returns to step 1010 to continue monitoring; otherwise, if the alert source is verified, the logic proceeds to Traversing at step 1018 the Lineage Archive. During this step, the Validation Processor 214 (see FIG. 2) directs the Lineage Archive Manager 914 to query the hierarchical HD-tree to identify siblings sharing a derivation lineage with the compromised hardware.

The routine continues with Calculating at step 1022 the Quarantine Radius, wherein the Quarantine-Radius Logic 918 applies a bit-mask to the Branching Identifier 326 (see FIG. 3) to determine the specific depth of the derivation branch to be isolated. Upon determining the radius, the routine moves to Populating at step 1026 the At-Risk List by writing the identified sibling identifiers into the At-Risk Identifier List 922 located within the Protected Partition 250 (see FIG. 2). The routine then proceeds to Broadcasting at step 1030 the Quarantine Order, transmitting a hardware-signed instruction to the Hardware Ecosystem 100 (see FIG. 1) to notify the Remote Synchronization Node 118 and peer nodes of the isolation event.

Following the broadcast, the routine branches based on whether the Branch is Fully Isolated at step 1034, as confirmed by the logical state of the Isolation Gates 926. If the gates successfully block all communication and value-transfer for the subset, the routine exits successfully. However, if the branch is not fully isolated at step 1034, the logic proceeds to Executing at step 1038 the Lineage Void. During this step, the apparatus activates the Lineage-Void Circuit 934, which triggers a local voltage dump or grounding of key storage pins to kill the compromised root branch and prevent the further propagation of invalid machine states.

In a practical application, a merchant utilizes this routine as a rapid incident response protocol to protect their liquidity from physical security breaches. For example, upon a "Tamper Signal" from a back-room terminal detected by a localized sensor, the gateway automatically voids that specific derivation path to prevent the compromised node from draining the merchant's liquidity through unauthorized transaction injections. This autonomous response ensures that even if a single device is physically breached, the hardware-enforced isolation prevents the exploit from spreading to the primary merchant account, thereby securing the remaining fleet and establishing the clean state required for the Local-Finality Apparatus shown in FIG. 11.

Figure 11:
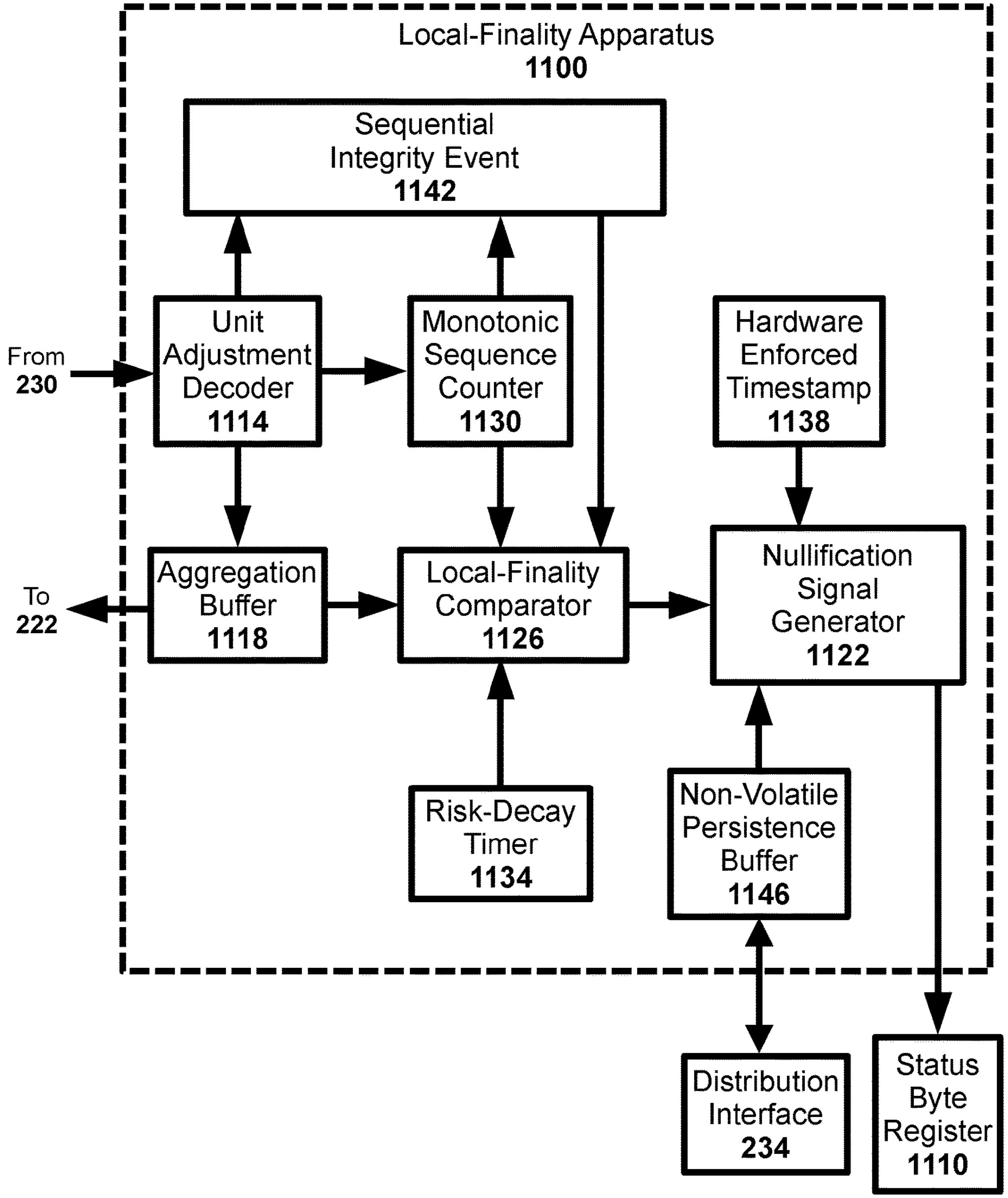
FIG. 11 is a functional block diagram illustrating a local-finality apparatus comprising a status-byte register, unit-adjustment decoder, and aggregation buffer in accordance with the present disclosure.

Referring to FIG. 11, a block diagram is illustrated representing a Local-Finality Apparatus 1100 configured for high-throughput state transitions and unit-sequestration within the Hardware Ecosystem 100 (see FIG. 1). The apparatus comprises a Status-Byte Register 1110 implemented as a physical non-volatile hardware flip-flop on a remote node to represent the operational lock or thaw state of the hardware. This register is communicatively coupled to a hardware logic gate functioning as a physical bus arbiter (e.g., an enabling gate for the Secure Local Data Bus 218) to enforce mutual exclusion and prevent race conditions. The apparatus further comprises a Unit-Adjustment Decoder 1114, which provides the dedicated logic for extracting numerical unit-values and monotonic sequence indices from hardware-verified records received via the Local Interface 230 (see FIG. 2). To ensure high-speed processing, the apparatus includes an Aggregation Buffer 1118, defined as a dedicated SRAM partition or high-speed non-volatile memory that is resident within the Node Gateway 200 and electrically isolated from the primary CPU to store uncommitted sequestration records for back-office reconciliation.

The system further includes a Nullification-Signal Generator 1122, comprising circuitry for producing an encrypted, hardware-signed instruction to toggle the Status-Byte Register 1110. This generator is electrically triggered by a Local-Finality Comparator 1126, a logic circuit configured to evaluate the cumulative unit total within the buffer 1118 against the node's pre-authorized unit-capacity. To prevent replay-injection and ensure data ordering, the apparatus utilizes a Monotonic Sequence Counter 1130 and a Risk-Decay Timer 1134, the latter being a clock-gated circuit that triggers a forced synchronization event if a record remains uncommitted beyond a hard-coded temporal limit. Furthermore, a Hardware-Enforced Timestamp 1138 provides a silicon-signed record of the window of authority, while a Non-Volatile Persistence-Buffer 1146, such as battery-backed SRAM or MRAM, is electrically coupled to the Nullification-Signal Generator 1122 to queue revocation and nullification signals to ensure state integrity during periods of connectivity or power loss.

In a practical application, a merchant utilizes this subsystem within the Merchant Gateway to maintain high-volume throughput during peak sales periods without waiting for global network confirmation. For example, during a busy sale at a high-traffic point-of-sale terminal, the Merchant Gateway "thaws" a transaction in the Status-Byte Register 1110 immediately upon local validation, moving the line forward and providing instant finality to the consumer while the heavier ledger synchronization and batch-recordation happen in the background. This hardware-gated "thaw" mechanism prevents terminal latency from impacting the physical checkout experience and establishes the verified data structure necessary for the Sequestration Record Verification Routine shown in FIG. 12.

Figure 12:
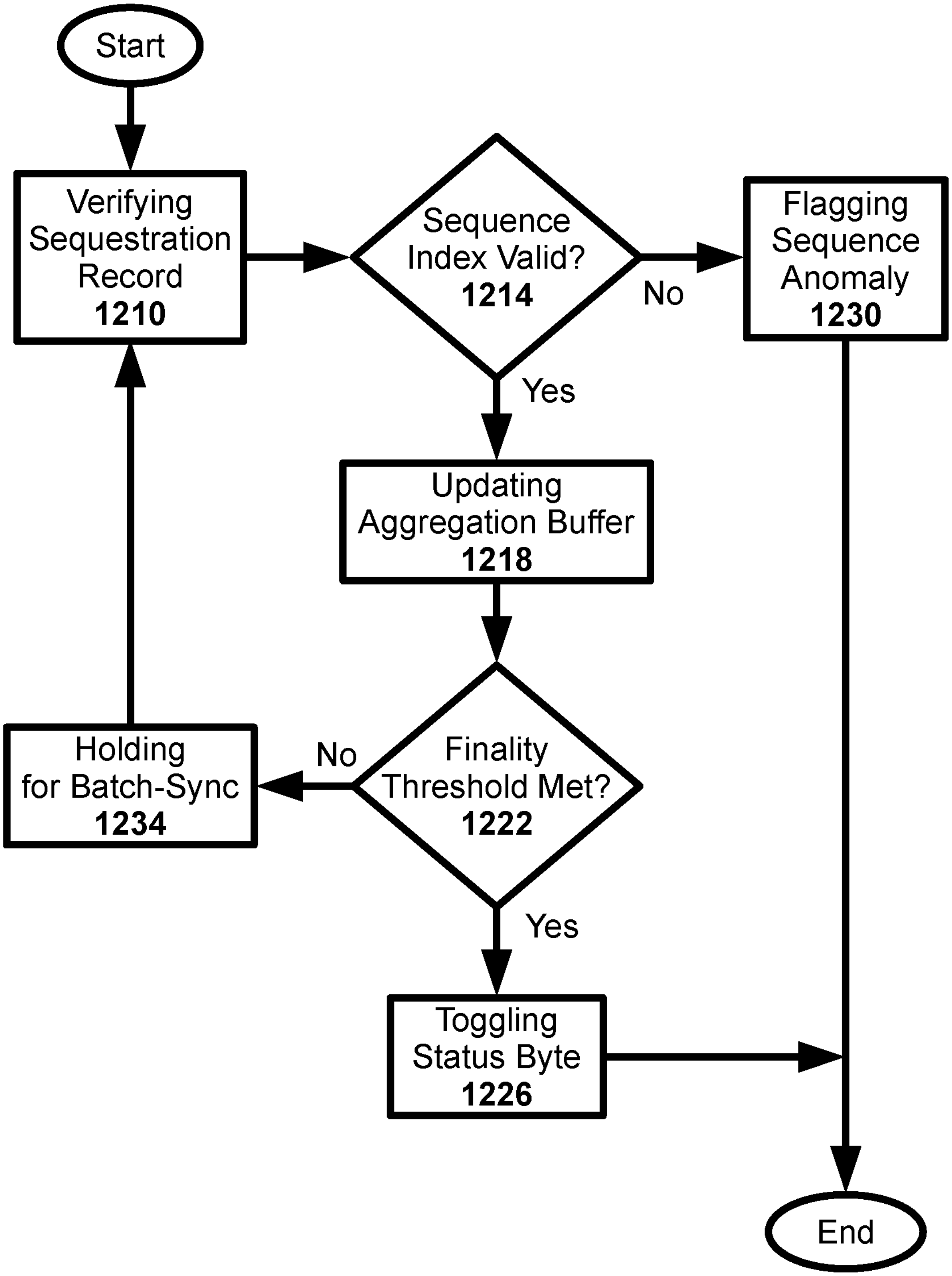
FIG. 12 is a flowchart illustrating a method for state-finality execution including toggling a status-byte via a nullification signal in accordance with the present disclosure.

Referring to FIG. 12, a flowchart illustrates the logical progression for the Local-Finality Apparatus 1100 (see FIG. 11) to manage high-throughput unit-sequestration and hardware state transitions. The process begins with the Validation Processor 214 (see FIG. 2) Verifying at step 1210 a Sequestration Record by authenticating the cryptographic signature and sequence-code of an incoming node record. Following this authentication, the internal logic evaluates the sequence index at step 1214; if the sequence index is valid and matches the Monotonic Sequence Counter 1130 (see FIG. 11), then the process leads to step 1218, or if the sequence index is invalid and indicates a potential replay attack, then the process leads to step 1230. The HPEE 210 (see FIG. 2) executes the action of Updating at step 1218 the Aggregation Buffer by writing the verified unit-adjustment into the local Aggregation Buffer 1118 (see FIG. 11). Conversely, the apparatus performs the action of Flagging at step 1230 a Sequence Anomaly to trigger a forensic alert and store the failure state in the Non-Volatile Hardware Memory 222 (see FIG. 2).

Upon the successful update of the buffer, the Local-Finality Comparator 1126 (see FIG. 11) determines if the sequestration total justifies a state change at step 1222; if the finality threshold is met, then the process leads to step 1226, or if the finality threshold is not met, then the process leads to step 1234. The Nullification-Signal Generator 1122 (see FIG. 11) performs the action of Toggling at step 1226 the Status Byte by transmitting an encrypted instruction to change the operational state of the Status-Byte Register 1110 (see FIG. 11) on the remote node from a locked state to an available state. If the threshold is not reached, the apparatus executes the action of Holding for Batch-Sync at step 1234 until additional records arrive or the Risk-Decay Timer 1134 (see FIG. 11) triggers a forced commitment. This hardware-enforced logic ensures that the Status-Byte Register 1110 maintains a mutual exclusion state-a hardware-level lock enforced by a physical arbiter-thereby preventing race conditions between local state changes and the eventual settlement manifests retrieved via the Network Interface 238 (see FIG. 2).

In a practical application, this flowchart provides a mechanism for batch efficiency to reduce computational resource overhead and network costs associated with the Persistent Ledger 122 (see FIG. 1). For example, a gateway managing a cluster of electric vehicle charging stations buffers a plurality of energy-unit sales and, rather than executing individual high-cost ledger writes, sends them to the Remote Synchronization Node 118 (see FIG. 1) as a single high-integrity batch. This allows the individual charging pillars to remain operational and available for the next customer immediately, while the aggregate value is reconciled in the background, setting the stage for how these local commitments are validated by external peers in the Witness-Logic Sub-system 1300 of FIG. 13.

Figure 13:
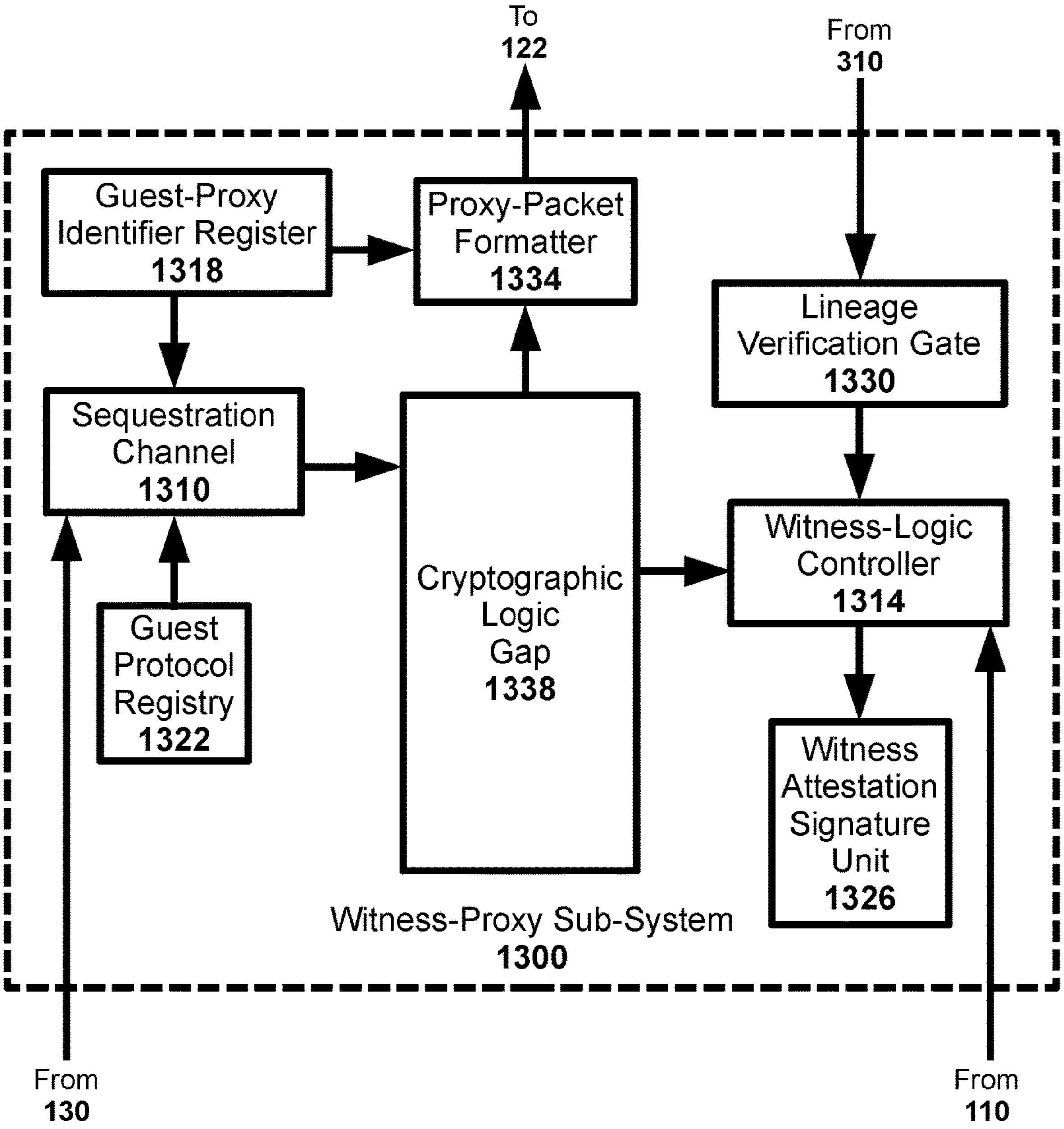
FIG. 13 is a block diagram illustrating a witness-proxy sub-system for established sequestration-channels and generating witness-attestation signatures in accordance with the present disclosure.

Referring to FIG. 13, a block diagram illustrates the Witness-Proxy Sub-system 1300 configured for hardware-verified validation of peer commitments and guest-node sequestration. The apparatus establishes a Sequestration-Channel 1310, which comprises a hardware-isolated zero-trust tunnel within the HPEE 210 (see FIG. 2) of the Node Gateway 200 for the management of guest data traffic. To facilitate peer-to-peer validation between siblings, the Witness-Logic Controller 1314 provides the circuitry for verifying sibling commitments and driving the Witness-Attestation Signature Unit 1326, which is a dedicated cryptographic module for signing peer-to-peer unit commitments. The Witness-Logic Controller 1314 is configured to process commitments from a sibling node prior to the receipt of signals from the Persistent Ledger 122. The system maintains a Guest-Proxy Identifier Register 1318 as a volatile register for storing the non-persistent tokens assigned to a Guest Hardware Node 130 (see FIG. 1), while the Guest-Protocol Registry 1322 stores the necessary protocol definitions and manifests for external hardware roots.

Integrity is enforced via the Lineage-Verification Gate 1330, which confirms that participants share the Master Root Merchant Key 310 (see FIG. 3) before allowing an internal witness attestation. For external data, the Proxy-Packet Formatter 1334 provides the hardware for reformatting guest data into ledger-compliant records while masking processing latency. A critical security boundary is maintained by the Cryptographic Logic Gap 1338, defined as a physical hardware-isolation barrier such as Dual-Port RAM configured such that the internal secure address space and external guest address space are never electrically addressed by the same bus simultaneously, which prevents cross-lineage data leakage between guest and local domains. This architecture ensures that the Validation Processor 214 (see FIG. 2) can oversee guest operations without exposing the internal secure address space of the Merchant Gateway.

In a practical application, this sub-system enables a Vendor-in-Shop scenario where a third-party vendor (Guest) sets up a kiosk in the merchant's store. The Merchant Gateway acts as a sequestered proxy for their data packets via the Sequestration-Channel 1310 to provide transaction integrity without giving the guest node any access to the merchant's private hardware vault or sensitive keys. This allows the guest to utilize the store's network infrastructure while the merchant maintains a hard cryptographic gap between the guest's activity and the primary store lineage, setting the stage for the specific validation steps executed during a peer handshake as seen in FIG. 14.

Figure 14:
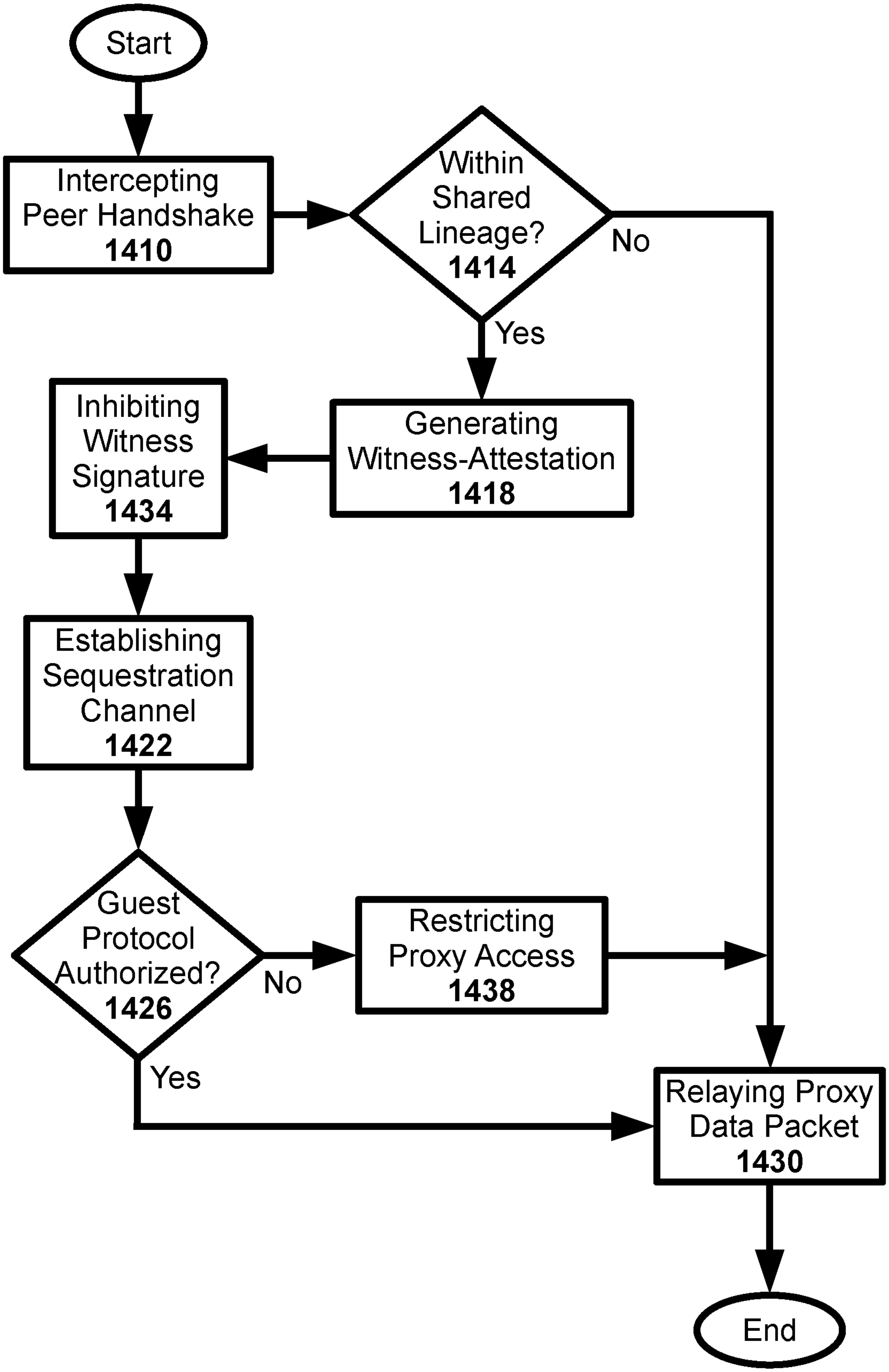
FIG. 14 is a flowchart illustrating a method for peer-to-peer witnessing and guest-data proxying via a shared lineage-verification gate in accordance with the present disclosure.

Referring to FIG. 14, a flowchart illustrates the operational logic for multi-node attestation and witness-gated proxying within the Hardware Ecosystem 100 (see FIG. 1). The method begins with the Local Interface 230 (see FIG. 2) performing the step of Intercepting at step 1410 a Peer Handshake by capturing a provisional unit commitment transmitted between the Sibling Hardware Node A 110 (see FIG. 1) and the Sibling Hardware Node B 114 (see FIG. 1). Upon capture, the Lineage-Verification Gate 1330 (see FIG. 13) evaluates the shared lineage state at step 1414; if the nodes are within the shared lineage by deriving from a common Master Root Merchant Key 310 (see FIG. 3), then the process leads to step 1418. If the participants fall outside the shared lineage or fail an integrity check, then the process leads to step 1434. The Witness-Attestation Signature Unit 1326 (see FIG. 13) performs the action of Generating at step 1418 a Witness-Attestation by signing the commitment and broadcasting the record to the Remote Synchronization Node 118 (see FIG. 1). Conversely, the apparatus performs the action of Inhibiting at step 1434 a Witness Signature to prevent the unauthorized recordation of the commitment.

In a contemporaneous or independent logic path, the system manages external hardware interactions by Establishing at step 1422 a Sequestration-Channel within the Sequestration-Channel 1310 (see FIG. 13) for a Guest Hardware Node 130 (see FIG. 1). Following channel establishment, the Validation Processor 214 (see FIG. 2) evaluates the guest credentials at step 1426; if the guest protocol is authorized via the Guest-Protocol Registry 1322 (see FIG. 13), then the process leads to step 1430. If the guest identity or protocol fails authorization, then the process leads to step 1438. The apparatus performs the action of Relaying at step 1430 a Proxy Data Packet by employing the Proxy-Packet Formatter 1334 (see FIG. 13) to forward sanitized data to the network. If authorization fails, the apparatus performs the action of Restricting at step 1438 Proxy Access by immediately terminating the Sequestration-Channel 1310.

In a practical application, this flowchart enables a Dual-Signoff security protocol for high-value retail returns. By requiring the gateway to "Witness" and sign the intent only after verifying the lineage of two distinct sibling terminals, the system ensures that a single rogue employee cannot issue a fraudulent refund in isolation. This rigorous multi-node sign-off requirement ensures that all unit-value adjustments are hardware-attested by the local ecosystem before being passed to the ledger, a state of data integrity that must be maintained even during critical hardware failures, such as those triggered by the power-loss detection logic described in FIG. 15.

Figure 15:
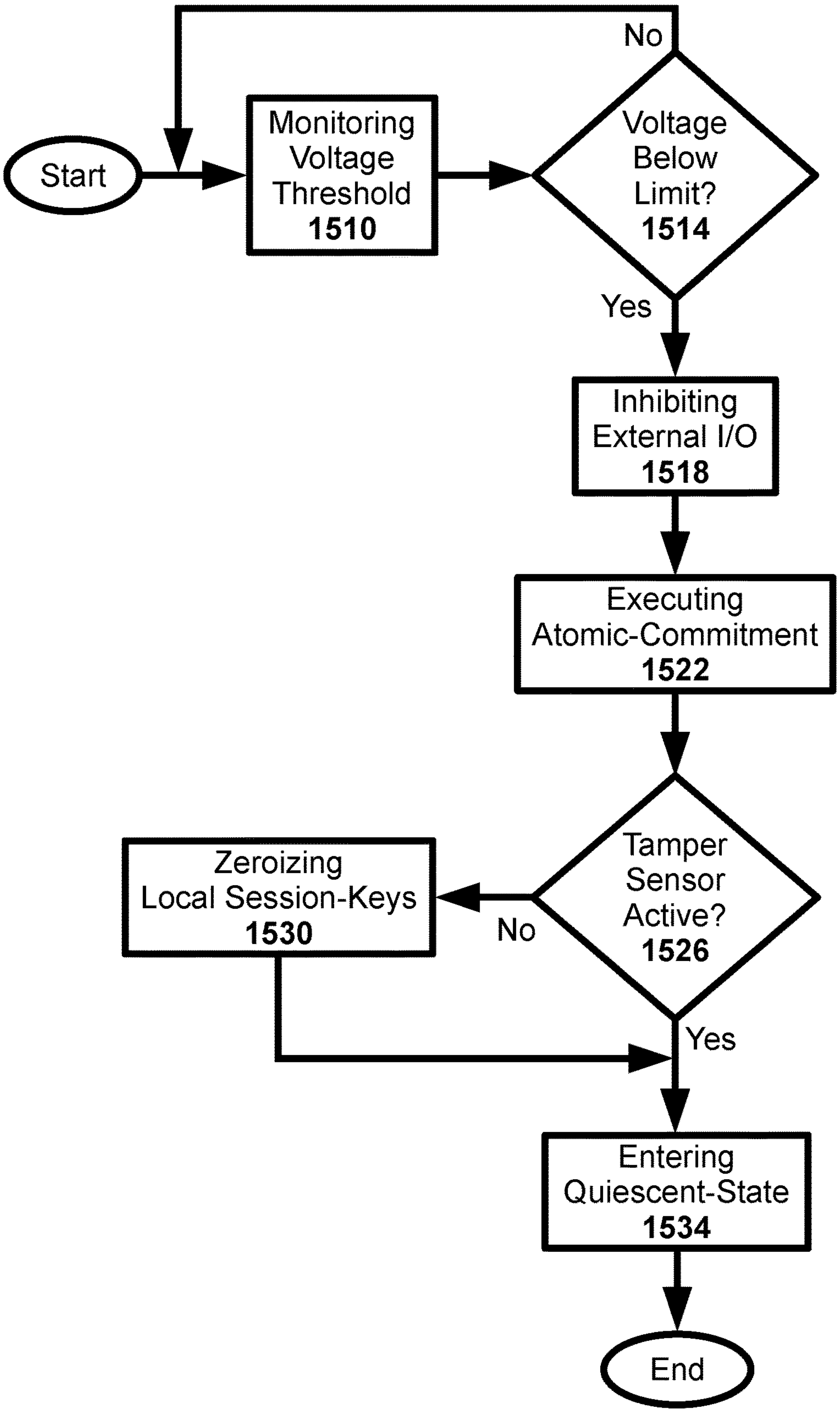
FIG. 15 is a flowchart illustrating a method for atomic state-commitment and memory preservation during a hardware-tamper or power-interruption event in accordance with the present disclosure.

Referring to FIG. 15, a flowchart illustrates a logic sequence for managing critical hardware states during an electrical instability event within the Hardware Apparatus 200 (see FIG. 2). The routine begins with the Validation Processor 214 (see FIG. 2) Monitoring at step 1510 the Voltage Threshold by performing continuous hardware polling of the Power-Monitoring Circuit 226 (see FIG. 2) to ensure the electrical supply remains within the defined stability-margin. Following this polling, the apparatus determines the status of the input power at step 1514; if the voltage is below the critical limit, then the process leads to step 1518, or if the voltage remains above the critical limit, then the process leads back to step 1510. At step 1518, the logic executes the action of Inhibiting at step 1518 the External I/O by rapidly closing all hardware interfaces, including the Local Interface 230 (see FIG. 2) and Registry Interface 242 (see FIG. 2), to prevent the injection of corrupted data or incomplete transaction packets during the brownout.

Upon securing the interfaces, the HPEE 210 (see FIG. 2) performs the step of Executing at step 1522 the Atomic-Commitment by initiating a high-priority write of the Aggregation Buffer 1118 (see FIG. 11) to the Non-Volatile Hardware Memory 222 (see FIG. 2). This atomic operation ensures that any uncommitted sequestration records are persisted to MRAM or battery-backed SRAM before total power depletion. Subsequent to the data commit, the system evaluates the physical security environment at step 1526; if the tamper-sensor is active, then the process leads to step 1530, or if the tamper-sensor is inactive, then the process leads to step 1534. At step 1530, the apparatus performs the action of Zeroizing at step 1530 the Local Session-Keys by irreversibly clearing volatile registers within the Protected Partition 250 (see FIG. 2) to mitigate side-channel extraction risks. Finally, the apparatus performs the action of Entering at step 1534 the Quiescent-State by parking the hardware in a low-power, read-only mode until a verified restart occurs.

In a practical application, this routine functions as robust brownout protection to ensure that a merchant is not left out of pocket for a final sale if a retail location loses power unexpectedly. For example, if a store experiences a sudden grid failure during a transaction, the Power-Monitoring Circuit 226 triggers a non-maskable interrupt that allows the system to save the last Sequestration Record to the persistent MRAM of the Non-Volatile Hardware Memory 222 using residual capacitive energy. This ensures that the transaction state is preserved with absolute integrity, allowing the unit-adjustment to be reconciled once power is restored, which maintains the continuity of the audit logs managed by the Settlement & Security Oversight Sub-system 1600 of FIG. 16.

Figure 16:
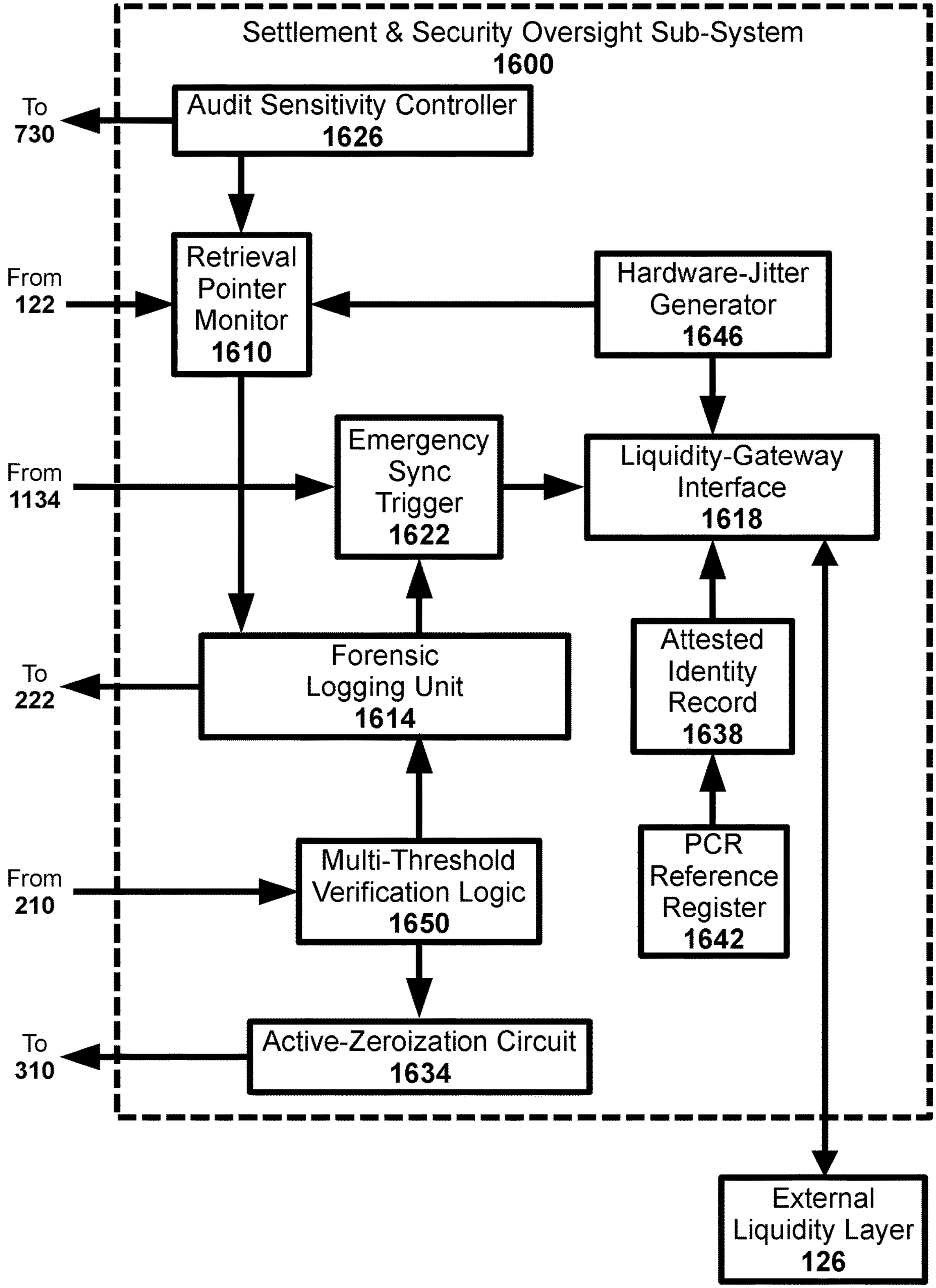
FIG. 16 is a block diagram of a settlement and security oversight sub-system for generating hardware-attested dispute records and forensic quarantine logs in accordance with the present disclosure.

Referring to FIG. 16, a block diagram illustrates the Settlement & Security Oversight Sub-system 1600 configured as a hardware-integrated management layer for auditing, forensic logging, and identity-record validation. The apparatus includes a Retrieval-Pointer Monitor 1610, which comprises hardware logic resident within the Node Gateway 200 for matching cryptographic commitment hashes against the validated data stream retrieved from the Persistent Ledger 122 (see FIG. 1). To ensure accountability, the Forensic Logging Unit 1614 utilizes a secure non-volatile memory segment for writing hardware-attested records of node failures, lineage rotations, or quarantine events, thereby providing a permanent audit trail within the Non- Volatile Hardware Memory 222 (see FIG. 2); the Forensic Logging Unit 1614 is communicatively coupled to the Retrieval-Pointer Monitor 1610 and the Emergency Sync Trigger 1622 to capture and timestamp all reconciliation and synchronization anomalies. External value transfers are managed by the Liquidity-Gateway Interface 1618, which provides the hardware logic necessary to communicate with the External Liquidity Layer 126 (see FIG. 1) and trigger commitment-based settlement.

Systemic integrity is further maintained by the Emergency Sync Trigger 1622, which serves as a hardware watchdog for executing a forced synchronization via the Liquidity-Gateway Interface 1618 in the event of a buffer overflow or the expiration of the Risk-Decay Timer 1134 (see FIG. 11). For dynamic risk management, the Audit-Sensitivity Controller 1626 provides logic for adjusting the reconciliation-gap threshold based on observed network risk, effectively modulating the strictness of the Hardware-Limit Comparator 730 (see FIG. 7) and the matching parameters of the Retrieval-Pointer Monitor 1610. In extreme compromise scenarios, the Active-Zeroization Circuit 1634 acts as a voltage-dump trigger for the irreversible physical destruction of the Master Merchant Root Key 310 (see FIG. 3) stored within the HSM 254 (see FIG. 2). The Active-Zeroization Circuit 1634 is electrically coupled to a Multi-Threshold Verification Logic 1650 residing within the HPEE 210. The Multi-Threshold Verification Logic 1650 is configured as a hardware comparator circuit that requires a confirmed breach signature from a physical tamper-mesh or a cryptographic failure-threshold counter prior to activating the voltage-dump trigger and signaling a terminal critical-failure event to the Forensic Logging Unit 1614.

Furthermore, the sub-system generates and stores an Attested Identity Record 1638, which is a hardware-signed data structure containing the device quote and platform configuration register (PCR) reference values stored in the PCR Reference Register 1642; the Attested Identity Record 1638 is electrically coupled to the Liquidity-Gateway Interface 1618 to provide hardware-origin proofing for all outbound value transfers. To prevent side-channel analysis during sensitive data relays, the Hardware-Jitter Generator 1646 utilizes a wait-state logic circuit to inject randomized clock cycles into the bus timing of the Liquidity-Gateway Interface 1618 and the Retrieval-Pointer Monitor 1610 to mask processing latency and power-consumption signatures.

In a practical application, this sub-system facilitates robust Compliance Logging by maintaining a tamper-proof audit trail of every key rotation and hardware status change. The Merchant Gateway ensures that the merchant possesses a "Forensic Log" that satisfies stringent tax or regulatory requirements by binding every administrative action to a hardware-signed timestamp and a specific boot-state measurement. This level of oversight provides the necessary forensic evidence to verify that the local ecosystem remained within authorized operational bounds during a reporting period, establishing the verified identity state required to initialize and manage the hardware-protected components of the Remote Sibling Architecture as detailed in FIG. 17.

Figure 17:
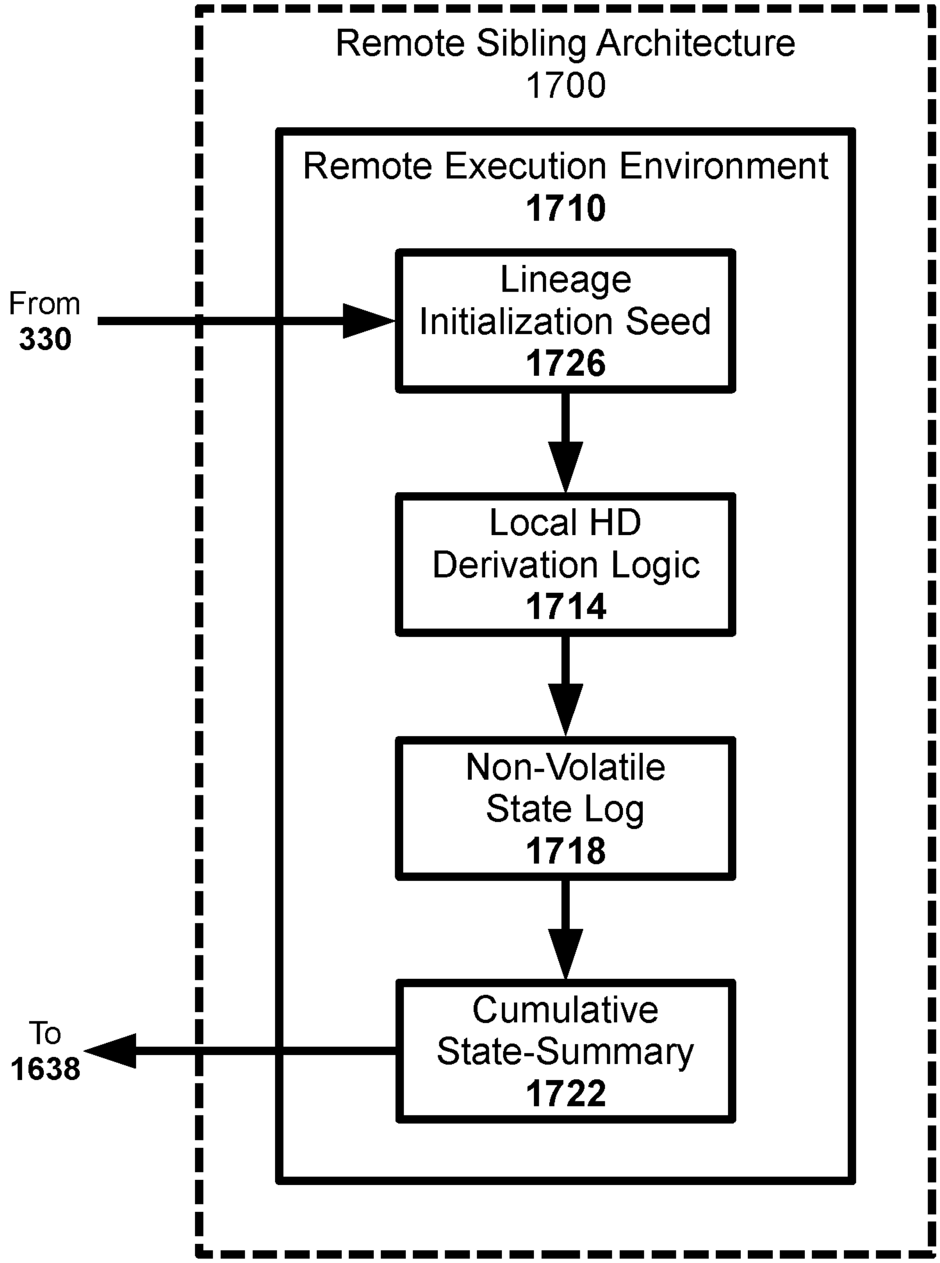
FIG. 17 is a functional block diagram illustrating a remote sibling architecture comprising a remote execution environment, local HD-derivation logic, and a cumulative state-summary in accordance with the present disclosure.

Referring to FIG. 17, a structural block diagram illustrates the Remote Sibling Architecture 1700 configured as a hardware-protected sub-system within a remote node managed by the apparatus. The architecture includes a Remote Execution Environment 1710 which serves as a primary isolated computing environment, physically separated from the node's general-purpose processor to prevent unauthorized memory access. Within this environment, the Local HD-Derivation Logic 1714 comprises a dedicated silicon-logic array configured to ingest a Lineage-Initialization Seed 1726—an entropy-based data structure transmitted from the Lineage Master Seed 330 (see FIG. 3)—to autonomously derive a unique hierarchical key tree.

To maintain a verifiable record of all local state-transitions, the Non-Volatile State Log 1718 provides a persistent hardware-backed storage medium that records every unit-adjustment and epoch-update. The Non-Volatile State Log 1718 is logically coupled to the Local HD-Derivation Logic 1714 to ensure all logged transitions are cryptographically bound to the derived key tree. These entries are periodically hashed into a Cumulative State-Summary 1722, which provides a cryptographic digest of the node's historical activity and serves as the primary data structure for the Attested Identity Record 1638 (see FIG. 16) during audit cycles. This configuration ensures that the remote node can verify its own internal state against the merchant-lineage without an active network connection, utilizing the high-integrity registers of the execution environment to enforce local finality.

In a practical application, this architecture enables efficient Fleet Provisioning, such as when a merchant sends a plurality of terminals to a large-scale venue. Each terminal arrives "Lineage-Initialized," equipped with the specific silicon-logic required to derive its own secure child-keys and operate offline the moment it powers up at its assigned stall. By using the pre-shared initialization seed to anchor its local root of trust, the hardware can immediately begin processing local transactions while maintaining a tamper-proof log of its own health and identity. This autonomous structural readiness establishes the remote node as a trusted sibling within the ecosystem, providing the hardware-bound identity necessary for the apparatus to begin the Sibling Maintenance Routine as detailed in FIG. 18.

Figure 18:
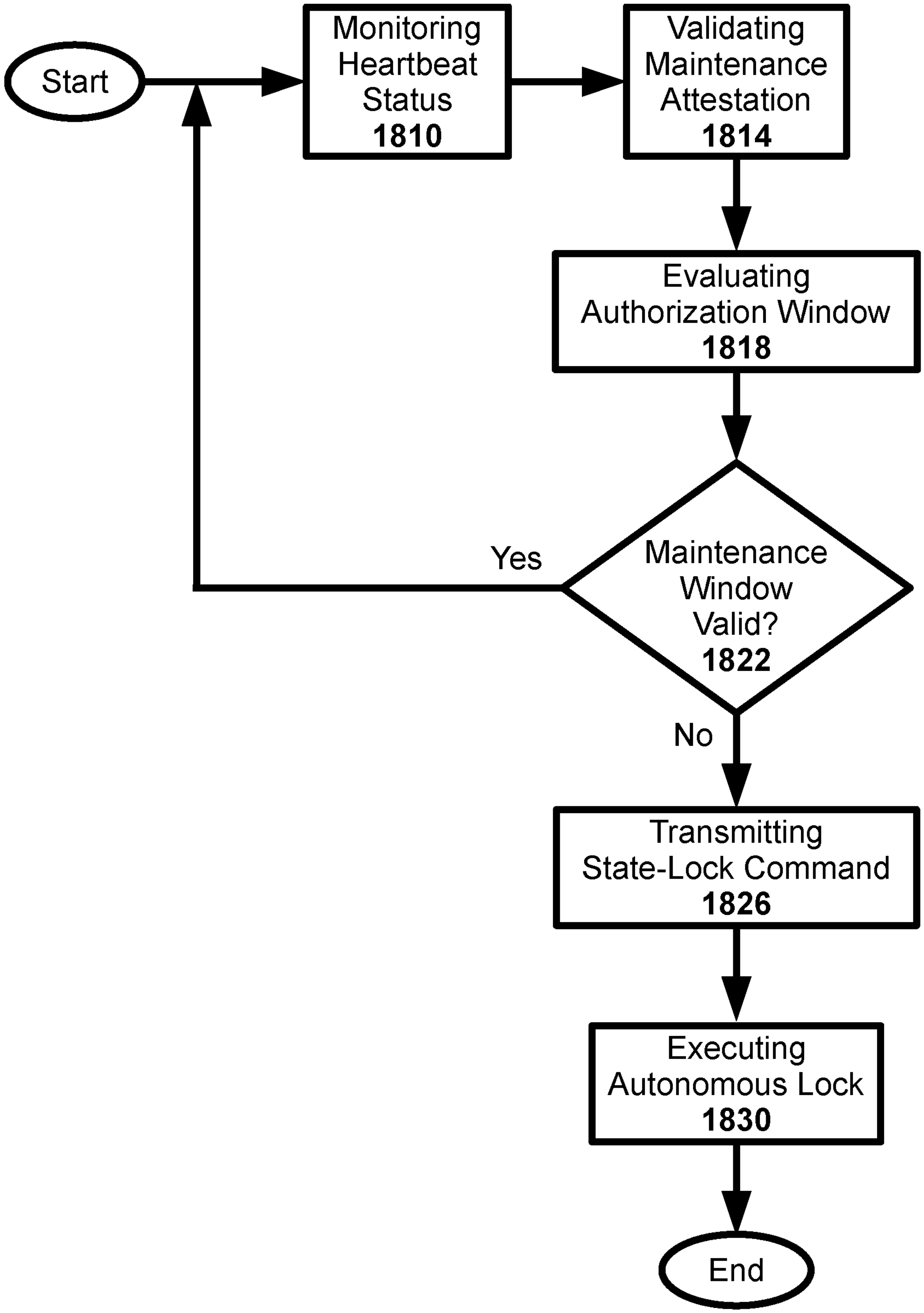
FIG. 18 is a flowchart illustrating a sibling maintenance routine for monitoring heartbeat status and executing an autonomous lock protocol within a temporal authorization window in accordance with the present disclosure.

Referring to FIG. 18, a logic flow diagram illustrates the Sibling Maintenance Routine configured as a hardware-enforced sequence for the autonomous revocation of remote hardware nodes. The routine commences with Monitoring at step 1810 the Heartbeat Status to capture the arrival of a periodic maintenance attestation from a Sibling Hardware Node A 110 (see FIG. 1). The process continues with Validating at step 1814 the Maintenance Attestation to verify the cryptographic signature and device-quote against the Registry Interface 242 (see FIG. 2). Following successful verification of the identity, the sequence proceeds to Evaluating at step 1818 the Authorization Window by comparing the received heartbeat timestamp against the hardware-defined temporal limits of the Master Epoch Counter 510 (see FIG. 5). The Node Gateway 200 functions as the authoritative temporal source for this evaluation to ensure back-office lineage synchronization.

The routine then transitions to a decision point to determine the status of the maintenance window at step 1822; if the timestamp aligns with the allowed temporal drift, then the process leads back to step 1810. If the heartbeat is absent or the timestamp exceeds the stability threshold, then the process leads to step 1826. At step 1826, the logic executes the action of Transmitting at step 1826 the State-Lock Command to broadcast an encrypted instruction via the Distribution Interface 234 (see FIG. 2). The Node Gateway 200 matches the retrieval pointer of the missing heartbeat to a settled ledger event prior to final revocation. The sequence concludes with Executing at step 1830 the Autonomous Lock to trigger the local transition to a restricted state within the Status-Byte Register 1110 (see FIG. 11).

In a practical application, this routine provides a mechanism for Automatic Revocation to protect the integrity of the merchant's fleet. If a terminal is stolen and taken off-site, it inevitably fails to send its periodic heartbeat to the Merchant Gateway because it has been removed from the secure local environment or the authorized synchronization interval has lapsed. This failure to check in causes the terminal to self-nullify its own derivation path automatically, rendering the hardware useless to an unauthorized possessor. By enforcing this strict temporal leash, the merchant ensures that only hardware in physical or logical proximity to the management apparatus remains active, creating a secure operational perimeter that necessitates the robust, zero-trust data handling managed by the Guest Proxy Sub-system as detailed in FIG. 19.

Figure 19:
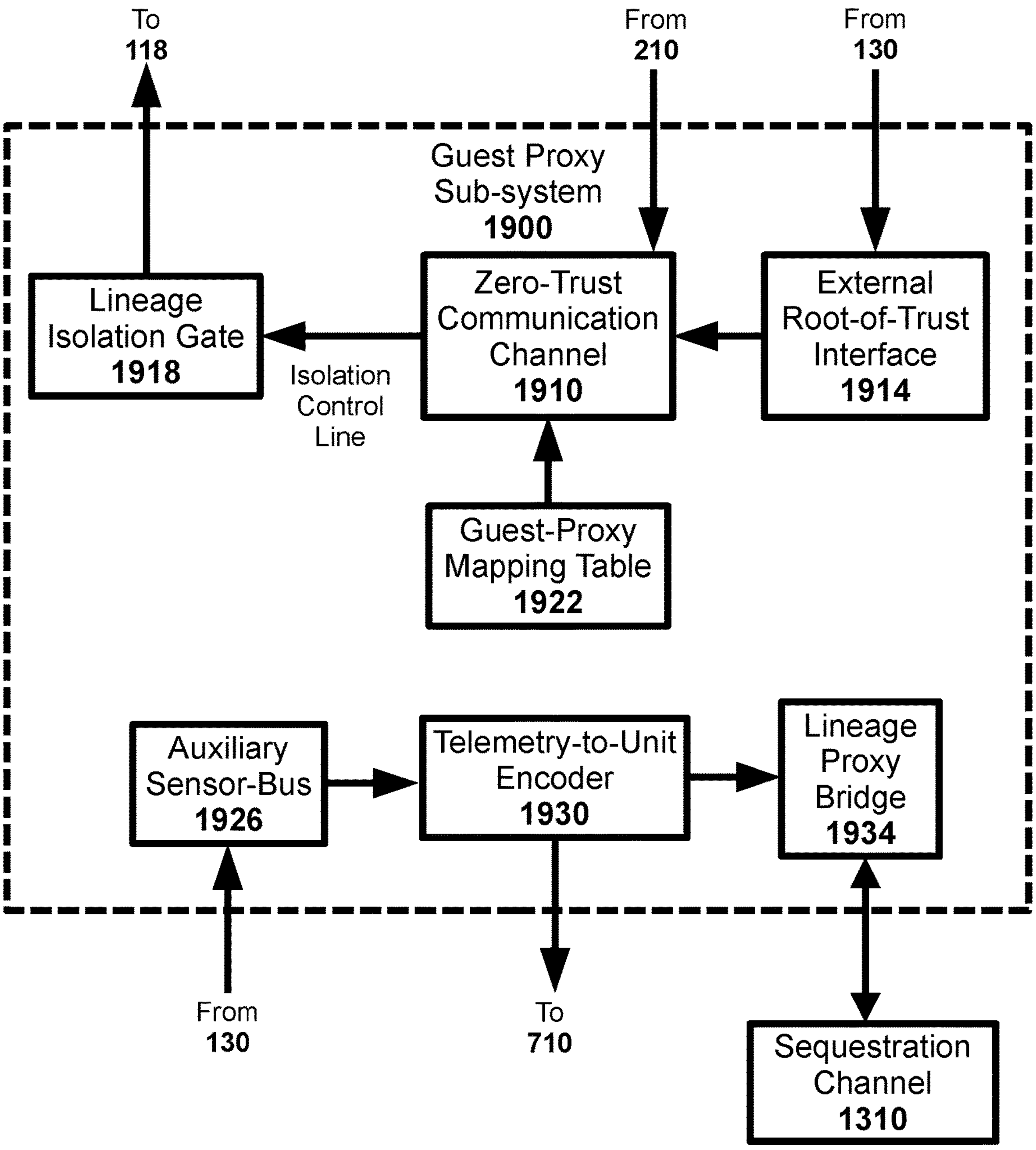
FIG. 19 is a block diagram illustrating a guest-proxy sub-system for establishing a zero-trust communication channel and converting external telemetry into hardware-signed unit commitments via a lineage-isolation gate in accordance with the present disclosure.

Referring to FIG. 19, a structural block diagram illustrates the Guest Proxy Sub-system 1900 configured as a Node Gateway hardware-isolated gateway for managing data traffic between the apparatus and lineage-external hardware nodes. In a first embodiment, the sub-system is configured as a Merchant Gateway, while in secondary embodiments, the sub-system functions as an industrial or infrastructure controller for lineage-agnostic data proxying. The sub-system includes a Zero-Trust Communication Channel 1910 comprising a hardware-sequestered tunnel within the HPEE 210 (see FIG. 2) that physically separates foreign data packets from the primary merchant-lineage memory space. An External Root-of-Trust Interface 1914 is provided as a dedicated hardware logic gate configured to ingest and verify third-party hardware credentials from a Guest Hardware Node 130 (see FIG. 1) against manufacturer-signed certificates. To prevent cross-contamination of sensitive assets, a Lineage-Isolation Gate 1918 utilizes a physical logic-gate array to block unauthorized data leakage between the proxy environment and the Remote Synchronization Node 118 (see FIG. 1).

The architecture further utilizes a Guest-Proxy Mapping Table 1922 stored within a secure segment of the HSM 254 (see FIG. 2) to associate transient guest identifiers with their respective external hardware identities. For interactions involving non-cryptographic hardware, an Auxiliary Sensor-Bus 1926 provides a galvanically isolated physical port, such as a serial-based industrial protocol interface, to safely ingest raw telemetry without risking electrical exposure to the internal logic units. This telemetry is converted into secure data structures by a Telemetry-to-Unit Encoder 1930, which transforms physical signals into signed provisional unit commitments delivered to the Running-Inflow Accumulator 710 (see FIG. 7). A Lineage-Proxy Bridge 1934 facilitates the secure relay of these commitments, functioning as a high-integrity buffer that allows external providers to audit specific child-node activities via the Sequestration-Channel 1310 (see FIG. 13) without obtaining access to the master merchant's billing keys or transaction archives.

In a practical application, this sub-system enables seamless Loyalty Integration while maintaining strict infrastructure security. For instance, a customer may utilize a third-party rewards chip at a merchant's terminal to claim points. The Guest Proxy Sub-system 1900 creates a functional "Logic Gap" that allows the Merchant Gateway to process and verify the rewards points within the isolated tunnel of the Zero-Trust Communication Channel 1910 without ever exposing the merchant's private transaction database or root cryptographic keys to the external rewards company. By sequestering the guest's foreign root of trust at the hardware level, the merchant can offer interoperable services with complete confidence that a compromise of the third-party reward system cannot migrate into the core merchant-lineage. This state-of-the-art isolation provides the necessary security foundation for the oversight and administrative controls managed by the Administrative Interface as detailed in FIG. 20.

Figure 20:
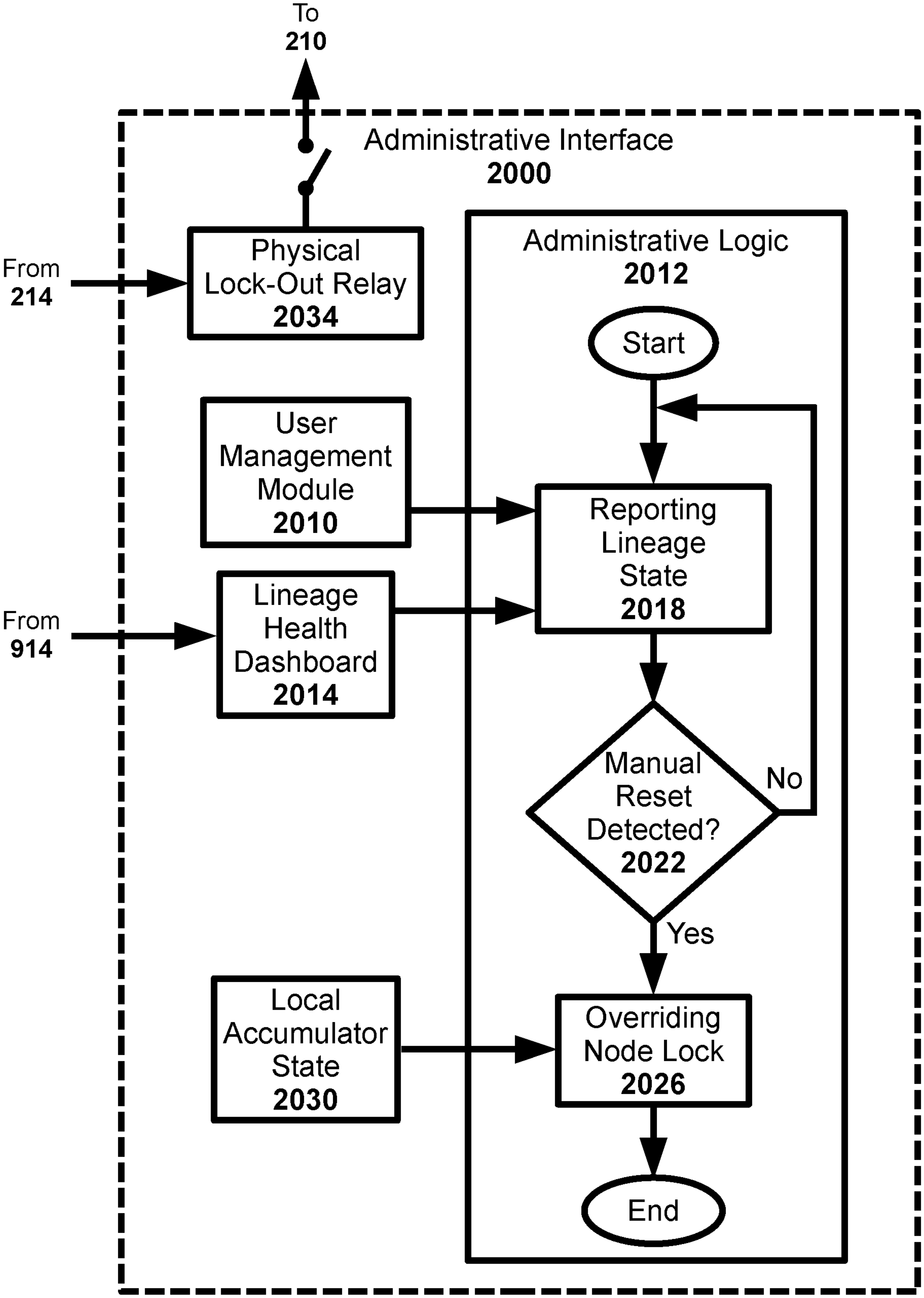
FIG. 20 is a combined block and flowchart diagram illustrating an administrative interface for rendering a lineage-health dashboard and executing a hardware-gated manual override of a node-lock or service-relay state in accordance with the present disclosure.

Referring to FIG. 20, a combination block and logic flow diagram illustrates the Administrative Interface 2000 configured as a high-integrity hardware assembly for operator oversight and the manual recovery of lineage-bound hardware within the Node Gateway 200. The interface includes a User Management Module 2010 comprising a logic block within the Node Gateway 200 (see FIG. 2) for rendering real-time state alerts and processing physical reset commands transmitted to the HPEE 210 (see FIG. 2). A Lineage Health Dashboard 2014 provides a visual or logical summary of system-wide integrity metrics, including active quarantines, blacklisted identifiers, and lineage-drift data retrieved from the Lineage Archive Manager 914 (see FIG. 9). The functional logic of the interface includes Reporting at step 2018 the Lineage State by outputting the current health and revocation status to the physical display for operator review.

The routine then transitions to a decision point to determine whether a Manual Reset is Detected at step 2022. If no physical override signal is detected from the hardware input, then the process leads back to step 2018. If an authorized operator triggers a physical override, then the process leads to step 2026. At step 2026, the logic executes the action of Overriding at step 2026 the Node Lock, which executes a hardware-gated instruction through a dedicated bypass to restore a sibling node to an active state following a manual security audit. This restoration logic is cross-referenced against the Local-Accumulator State 2030, which serves as a non-volatile hardware baseline for reconciliation when the network is offline. In the event of a catastrophic security breach, the Validation Processor 214 (see FIG. 2) is configured to trigger a Physical Lock-Out Relay 2034, comprising a hardware-disconnect switch that physically separates power or data services upon a lineage-void event to prevent further unauthorized activity.

In a practical application, this interface provides a critical fail-safe for Manual Recovery after an automated security lock-out. For example, if a store terminal is flagged for an anomalous temporal drift due to a localized hardware glitch, the system may automatically place that terminal into a quarantined state. A store manager, after conducting a physical audit of the device, utilizes the Administrative Interface 2000 to verify their identity and trigger the Overriding at step 2026 the Node Lock. This physical intervention allows the manager to restore the terminal to the active lineage status without compromising the underlying cryptographic root, ensuring business continuity while maintaining the strict fail-closed security posture of the wider ecosystem. This administrative oversight ensures that the automated protections of the lineage do not result in permanent operational paralysis, providing a human-in-the-loop validation layer for the high-integrity hardware controls.

The integration of the hardware sub-systems as described in the previous figures establishes the apparatus as a localized coordination hub for any distributed network of hardware-bound nodes. While the primary merchant-centric embodiment focuses on the reconciliation of unit-values representing currency or credit, the structural logic of the protected execution environment and the running-inflow accumulator is indifferent to the data type. By utilizing the auxiliary sensor-bus, the apparatus physically ingests raw electrical or digital signals from external environmental sources-such as flow-rate pulses from a water meter, kilowatt-hour telemetry from an electric charger, or packetfrequency data from a network router-and converts these signals into hardware-attested commitments. This transformation of physical telemetry into a cryptographically bound lineage allows the apparatus to function as an autonomous resource-management gateway in environments lacking persistent network backhaul, including public infrastructure or remote recreation settings such as national parks and off-grid transit systems.

In these high-throughput scenarios, the apparatus enables the issuance of hardware-bound fobs or adventure passes that function without a central bank link. The sibling nodes communicate directly with the merchant gateway to authorize entry or transit in real-time. Because the status-byte register toggles the authorized state locally independent of primary system software, users experience zero latency, while the aggregation buffer queues records for ledger synchronization once backhaul is restored. This prevents bottlenecking in high-volume environments like subway turnstiles or ski resort lift-gates, where the hardware makes local-finality decisions based on pre-defined unit capacities rather than waiting for cloud-based confirmation. In utility deployments, the stale-data timer and stability-threshold register further ensure that remote meters or service-delivery nodes cannot operate outside of a verified temporal window. If a node fails to handshake or reports a variance exceeding the defined threshold, the physical lock-out relay provides a mechanical severance of the service line, ensuring that resource consumption is strictly reconciled against the persistent ledger state.

The system further provides a sophisticated mechanism for managing the lifecycle and physical security of distributed assets, such as a fleet of shared bicycles, leased cable boxes, or remote automated teller machines. Through the issuance of a lineage-initialization seed, the apparatus can provision thousands of remote sibling nodes with the cryptographic logic required to verify valid service tokens independently of a live network. To mitigate the risk of theft or unauthorized relocation, a maintenance routine monitors for heartbeat attestations within a hardware-defined temporal window. If a device is moved beyond its geofence or fails to sync, an autonomous lock protocol triggers a restrictive execution state, rendering the hardware useless until it is physically returned to an authorized administrative interface for a manual reset.

Furthermore, the apparatus facilitates secure interactions with third-party entities without exposing the sensitive root keys of the master lineage. In high-security logistics or multi-vendor environments, the guest-proxy sub-system allows the gateway to witness and attest to the arrival of guest nodes-such as a third-party delivery driver entering a warehouse or a loyalty application interacting with a retail terminal. A physical logic gap prevents the cross-contamination of data between the secure partition and the external guest node. This architecture is equally applicable to high-security data centers or government contractors, where an audit-sensitivity controller monitors for lifetime leakage or hardware tampering. By enforcing a hard factory-reset or a lineage-void event when a device exceeds a specific value threshold, the system replaces human oversight with a self-executing, silicon-locked enforcement layer capable of maintaining operational continuity and fiscal integrity across diverse industrial and commercial landscapes.

The attested identity record comprises a hardware-bound identifier and a cryptographic quote generated within a hardware-protected execution environment (HPEE) of the remote hardware node. This cryptographic quote includes a platform configuration register value representing a verified boot state to ensure the hardware-bound identifier is accessed only by an authorized firmware layer. To establish the lineage, the processor applies an HMAC-SHA256 keyed-hash message authentication code to a combination of a root merchant key and the hardware-bound identifier to generate a unique derivation path. This keyed-hash message authentication code is seeded with a physical entropy-string extracted from an internal true random number generator (TRNG) circuit to ensure path uniqueness. This path is encrypted using a public key associated with the identifier prior to transmission. Additionally, the record may include a cumulative hash of an internal nonvolatile transaction log stored within the remote node's HPEE, while a hardware-nonce is verified within the quote to prevent replay attacks.

A lineage seed is transmitted to the remote hardware node to initialize a local hierarchical deterministic (HD) key generator within its protected partition. The unique derivation path is mathematically linked to this seed, enabling the remote node to autonomously generate a sequence of transaction keys that the synchronization node can natively verify as belonging to the merchant lineage. This path further includes a temporal epoch segment configured to force the local HD key generator to rotate the transaction keys at predefined intervals. The foundational security for this process relies on a hardware root of trust, such as a manufacturer-signed certificate authority stored within a hardware-secured vault of the apparatus.

The system manages the merchant lineage by generating the unique derivation path through the appending of a merchant-specific identifier to a master root key held within a hardware security module (HSM). The memory stores a lineage state, and the processor triggers a revocation event if it detects a non-sequential transaction index, which indicates a lineage-desynchronization event. The persistent ledger, which may be a distributed hash table (DHT) shared among synchronization nodes, stores the permissioning state as a data structure. This configuration allows lineage-aware gatekeepers to perform hardware-enforced validation and restrict records originating from identifiers not recognized within the merchant lineage.

To maintain temporal control, the processor generates a hardware-enforced timestamp within the permissioning state to define a window of authority. The registry interface receives a recurring heartbeat attestation from the remote node, and a failure to receive this within an epoch-bound window triggers the node to self-nullify its derivation path. This window is dynamically adjusted based on a received temporal-drift parameter, where significant deviations trigger an early expiration. The publication of the permissioning state acts as a cryptographically verifiable instruction that shifts the remote node from a restricted initialization mode to an operational lineage mode.

Security is further reinforced by physical sensors that detect hardware-tamper signals, causing the monitoring interface to broadcast a lineage-void instruction to the ledger. During validation, a manufacturer root key is verified to ensure the remote node originates from an authorized silicon provider. The unique derivation path is a one-way function of the root key, preventing the remote node from reconstructing the root key. Before publishing the permissioning state, the processor queries a global birth registry to verify the identifier is not associated with a conflicting lineage, and an entropy salt unique to the merchant lineage is used to prevent cross-merchant device spoofing.

The memory stores a lineage-state and a provisioning log, where a pending-initialization status is assigned to the hardware-bound identifier to prevent concurrent provisioning attempts. This identifier transitions to an active status only after a cryptographic confirmation of the unique derivation path installation is received. The processor also checks identifiers against a blacklisted-identity record before path generation. If a threshold of nodes reports a shared hardware failure, the system broadcasts a bulk-revocation instruction. Forensic recovery tokens are generated to allow manual restoration of sibling units, and the unique derivation path is updated in response to root key rotation events recorded in a lineage-migration pointer.

Regarding lineage quarantine, a distribution interface transmits a hardware-signed quarantine broadcast identifying compromised nodes to the sibling population. This broadcast is bound to a master epoch counter for freshness and may include a forensic-challenge template requiring a hardware-signed response. Upon a verified re-keying, a quarantine-release signal is transmitted, contingent on nodes adopting a new derivation path. This broadcast triggers a restricted-execution mode, preventing nodes from accepting records from the compromised branch and redirecting suspicious records to a local-quarantine buffer for forensic validation.

For high-value transactions, the restricted execution mode requires a secondary cryptographic challenge-response handshake. The processor can initiate automated lineage migration for healthy identifiers to isolate the at-risk branch, which is identified by a common index path within an HD tree. Hardware-integrity signatures within the alert are verified, and the HPEE traverses the HD tree to calculate a quarantine radius based on an attestation-severity metric. To physically enforce the quarantine, the processor applies a bit-mask to a derivation-path register to isolate branching identifiers within the radius. An attested audit log and a reconciliation certificate are generated to document the deviation, with alerts potentially originating from external synchronization nodes via the persistent ledger.

In lineage-agnostic proxying, a hardware-attestation handshake verifies manufacturer-signed certificates against a pre-loaded root-of-trust stored in a secure element before establishing a zero-trust sequestration-channel. A temporary session key generated in the HPEE encrypts the channel and enforces a cryptographic logic gap to prevent data leakage. Temporal-jitter is injected into the data relay to mask processing latency and thwart timing-analysis attacks. The guest-proxy identifier is a non-persistent token that expires if the node leaves range or signal strength drops. Protocol definitions from a guest-manifest are used to reformat data packets, which then receive a proxy-witness signature distinct from the local merchant lineage.

The processor translates cryptographic proof formats between hardware dialects and ensures the guest node is not already registered in the local lineage. Relayed packets include a proxy-identity header to signal that state resolution is external to the apparatus. A blacklist-registry is used to exclude nodes from compromised manufacturers, and guest throughput is limited to prioritize local traffic. The network interface relays ledger nullification signals to the guest node, while buffered packets are sent via deferred-relay upon network restoration. Channel termination occurs if resource-utilization metrics exceed stability thresholds, keeping the guest root of trust isolated from the local root merchant key.

Witnessing operations involve verifying integrity attestations from both participating siblings before generating a signature. This signature includes a temporal metadata block to establish a monotonic sequence. Upon receiving a settlement confirmation with a Merkle proof, a secondary nullification signal, cryptographically bound to the witness signature hash, is sent to resolve the sequestration state. The apparatus quantifies the local-unit impact and generates a reconciliation-anchor to synchronize with the ledger. The hardware identity of the apparatus, stored in an HPEE, acts as a salt for hashing algorithms to ensure signature uniqueness.

The witness-attestation signature can be a prerequisite for local-finality, though a bypass token is available during connectivity failures. The processor verifies that siblings possess valid derivation paths and intercepts signed intents to modify status bytes. These signatures facilitate asynchronous state resolution and can initiate settlement-finalization sequences in an external liquidity layer. Hardware-verified clearing logic ensures signatures are released only upon confirmation, while settlement-latency metrics are calculated. Metadata is synchronized with a ledger-derived master-epoch counter to ensure consistent timestamping within a fixed interval.

Provisional commitments are evaluated against a merchant-defined risk manifest, and signatures are inhibited if local-finality thresholds are exceeded or if the apparatus is blacklisted in a witness-identity registry. Collateral-reservation requests are made to external liquidity layers, with denials inhibiting the signature. The system detects handshake collisions using sequence indices and performs partial-settlement validation for fractional adjustments. Rate-limiting is applied based on concurrency limits, and signatures are suppressed if lineage-integrity alerts are detected. Proximity detection protocols ensure siblings are within a defined physical radius, with proximity attestations included in the final signature.

The reconciliation-response routine may include a self-revocation routine that invalidates the root merchant key and broadcasts a signed lineage-void signal. This signal may require multi-signature attestation from external witnesses. The response is tiered, ranging from soft suspension of interfaces to active zeroization of the root key, potentially involving a logical hard-lock. Before revocation, a reconciliation certificate is generated, and a cool-down timer may be used to confirm variance levels. Historical logs track lifetime-leakage limits, and recovery-seed fragments are exported for state reconstruction. Variance is calculated against Merkle proofs, and thresholds are adjusted based on transaction volume or ledger-fork events.

The memory is further configured to store a merchant-defined risk manifest, and an updated version of this manifest is included within the signed epoch-attestation. If the temporal-drift parameter exceeds a maximum allowable threshold, the signed epoch-attestation triggers a restricted execution mode within the sibling hardware node. To refine this trigger, the processor calculates a drift-velocity parameter representing the rate of change of the temporal-drift over multiple handshakes, activating the restricted mode if this velocity exceeds a stability limit. Prior to generating the attestation, the processor verifies the hardware-bound identifier of the sibling node against a merchant-lineage archive. The master epoch counter used in this process is synchronized with a trusted time source provided by a persistent ledger.

During the periodic handshake, the processor extracts a monotonic unit-accumulator state from the sibling node and verifies transaction continuity by comparing it against previously recorded states in the archive. A sequence gap is identified if the accumulator state deviates from sequential incrementation. Furthermore, a variance-per-epoch parameter is calculated by dividing the change in the monotonic unit-accumulator state by the temporal-drift parameter. If this variance exceeds a throughput limit defined in the risk manifest, the processor generates a quarantine instruction. The change in the accumulator state is determined by subtracting the previously stored memory value from the state extracted during the current periodic handshake.

The signed epoch-attestation is cryptographically bound to a unique session key derived during the handshake. For connectivity, the local communication interface may utilize a short-range wireless transceiver for peer-to-peer proximity synchronization. The clock-correction command updates a hardware-protected real-time clock within the sibling node to align it with the master epoch counter. Additionally, the distribution interface can push a lineage-integrity alert within the attestation to notify the sibling of a compromised branch. Upon receiving a reset-confirmation from the sibling, the processor generates a reconciliation certificate documenting the drift and the successful timer reset.

Handshakes are initiated by the sibling node when its internal stale-data timer reaches an expiration threshold, at which point the sibling may enter a low-power restricted recovery mode. The stale-data timer is a hardware-gated register configured to disable a cryptographic signing engine upon reaching a zero-value state. To ensure the timer has not been modified by a primary operating system, the processor extracts a hardware integrity quote. The epoch-attestation also includes a sequence-anchor hash to bind the epoch counter to a specific position in the sibling's transaction chain. Clock corrections are performed as atomic updates to prevent partially-reset states, and the interface establishes an encrypted tunnel using the sibling's public key. The processor can bundle the attestation with a lineage-integrity alert to force simultaneous revocation and correction, while suppressing the attestation if a clock-manipulation anomaly—such as a reported time regression—is detected.

In localized state-finality embodiments, a hardware-protected execution environment (HPEE) maintains a monotonic unit-accumulator, while the memory stores an aggregation buffer. The processor sequesters the attested sequestration-confirmation record within this buffer and updates the accumulator upon generating a local nullification signal. If the aggregation buffer fill-level exceeds a capacity threshold, a forced synchronization event is initiated with a remote node to offload risk. A network interface transmits the buffered records to a remote synchronization node for global-ledger batch-recordation. To protect against data loss, a power-monitoring circuit triggers the HPEE to execute an atomic commit of the accumulator and buffer to non-volatile hardware memory during power interruptions.

A gateway-witness signature is appended to the sequestration-confirmation record before buffering, cryptographically binding the accumulator state to the record to provide a forensic link to global settlement. The monotonic unit-accumulator is an externally-read-only hardware counter that generates hardware-attested reconciliation-certificates representing a cumulative summation of unit adjustments. In some configurations, the counter requires a co-signature from a matching counter on the proximate node for validation. The local-finality threshold is calculated by evaluating unit adjustments against risk parameters in the merchant-defined risk manifest, such as maximum offline duration and cumulative adjustment limits. This threshold is configured to dynamically adjust based on connectivity loss, utilizing a non-linear temporal decay function to increase risk-mitigation as the offline duration persists.

The processor verifies that sequence indices from the confirmation records follow a strictly monotonic order. When using a short-range wireless transceiver for secure peer-to-peer sessions, the processor extracts entropy from the signal-to-noise ratio to seed session keys for the nullification signal. Records are rejected if their timestamps exceed a maximum allowable drift relative to the HPEE master clock, triggering a hardware-signed forensic quarantine record for diagnostic audit. The local nullification signal is encrypted using a session key derived from a hardware-attestation handshake. Finally, the processor verifies the proximate node's identifier against the lineage archive and generates a reconciliation-anchor to bind the nullification signal to a specific ledger depth, preventing the re-initiation of settled sessions.

For asynchronous state-resolution, the processor queries a transaction archive to match retrieval-pointers within settled status events to specific sibling identifiers. A reconciliation-certificate is generated by correlating the self-authenticating nullification signal with locally-stored resource allocation records. The distribution interface may deliver this signal during the initiation handshake of a subsequent transaction to trigger a deferred state change, which may require the sibling to present a confirmation record first. The nullification signal includes a Merkle proof of the transaction's inclusion in a finalized ledger block, while the retrieval pointer may be a hash of a provisional unit commitment.

The processor verifies hardware-integrity signatures within the settled status event to ensure they originate from an authorized synchronization node. The target status byte is a physical register that transitions sequestered records to a finalized state upon modification. Shared ancestry is confirmed by calculating a derivation path match using the root merchant key and the sibling's hardware-bound identifier through a mutual cryptographic handshake. The distribution interface may broadcast the nullification signal as a witness-attestation signature for secondary validation. The HPEE physically isolates the root merchant key from the network and distribution interfaces to ensure hardware-enforced security.

Lineage-variance is detected by comparing settled values against a running-inflow accumulator. If an aggregate-settlement-mismatch is detected, the system initiates an automated lineage-quarantine sequence that wraps the nullification signal in a forensic-challenge template requiring a signed audit log. The processor verifies blinded-settlement commitments from the ledger to match claimants without revealing specific identifiers. If a double-spend anomaly is detected—such as variance exceeding a threshold—the relay of the nullification signal is suspended regardless of the ledger status. This triggers a hardware-attested dispute record for transmission to the ledger to initiate a reversal. Additionally, the processor extracts master epoch counters from status events for clock correction and monitors for lineage-integrity alerts to suppress relays. Replay attacks are prevented by using nonce-wrapped envelopes based on the sibling's monotonic counter. For cross-chain settlement, the interface may route signals to secondary liquidity layers. Non-volatile buffers persist these signals during power loss, with integrity checksums performed during boot-up to prevent the relay of corrupted data. Multiple nullification signals can be aggregated into a single resolution packet to enable an atomic update of multiple status bytes.

Having described the technical architecture and functional logic of the present disclosure in detail, it is intended that the scope of the disclosure be defined by the claims appended hereto, and that all modifications, equivalents, and variations that fall within the spirit and scope of the disclosure be included therein. The use of specific terminology and numbering is intended to provide clarity and does not preclude the application of the broadest reasonable interpretation of the elements as defined in the summary, the introductory definitions, and the specific embodiments described herein.

Although the disclosure has been shown and described with respect to certain aspects or embodiments, equivalent alterations and modifications will occur to others skilled in the art upon the reading and understanding of this specification and the annexed drawings. In particular regard to the various functions performed by the above-described items referred to by numerals (components, assemblies, modules, etc.), the terms (including a reference to a "means") used to describe such items are intended to correspond, unless otherwise indicated, to any item which performs the specified function of the described item (e.g., that is functionally equivalent), even though not structurally equivalent to any exemplary structure which performs the function in the herein illustrated exemplary aspects of the disclosure. Such items shall be understood to include any combination of hardware, firmware, or machine-executable instructions (software) configured to perform the recited functions. In addition, while a particular feature of the disclosure may have been described above with respect to only one of several illustrated aspects, such feature may be combined with one or more other features of the other aspects, as may be desired and advantageous for any given or particular application. The use of the singular "a" or "an" is intended to include the plural "one or more" unless specifically stated otherwise.

The description herein with reference to the figures describes the present disclosure in sufficient detail to enable one skilled in the art to utilize the present disclosure in a variety of applications and devices. It will be readily apparent that various changes and modifications could be made therein without departing from the spirit and scope of the disclosure as defined in the following claims.

I claim:

1. An apparatus for hardware-node lifecycle management, comprising:

- a registry interface configured to receive an attested identity record from a remote hardware node;
- a memory;
- a processor configured to:
  - validate the attested identity record against a hardware root of trust;
  - generate a unique derivation path for the remote hardware node to identify the remote hardware node as a sibling unit within a merchant lineage; and
  - publish a permissioning state to a persistent ledger, the permissioning state being configured to authorize a synchronization node to accept records from the remote hardware node; and
- a monitoring interface configured to update the permissioning state in response to a revocation event to nullify a capability of the remote hardware node to commit records to the persistent ledger.

2. The apparatus of claim 1, wherein the attested identity record comprises a hardware-bound identifier and a cryptographic quote generated within a hardware-protected execution environment (HPEE) of the remote hardware node.

3. The apparatus of claim 2, wherein the cryptographic quote comprises a platform configuration register value representing a verified boot state of the remote hardware node to ensure the hardware-bound identifier is accessed only by an authorized firmware layer of the remote hardware node.

4. The apparatus of claim 2, the processor further configured to generate the unique derivation path by applying an HMAC-SHA256 keyed-hash message authentication code to a combination of a root merchant key and the hardware-bound identifier.

5. The apparatus of claim 1, the processor further configured to transmit a lineage seed to the remote hardware node, the lineage seed being configured to initialize a local hierarchical deterministic (HD) key generator within a protected partition of the remote hardware node.

6. The apparatus of claim 5, wherein the unique derivation path is mathematically linked to the lineage seed such that the remote hardware node can autonomously generate a sequence of transaction keys that are natively verifiable by the synchronization node as belonging to the merchant lineage.

7. The apparatus of claim 1, the memory further configured to store a lineage state, the processor further configured to trigger the revocation event upon a detection of a non-sequential transaction index within a transaction record received from the remote hardware node, indicating a lineage-desynchronization event within the lineage state.

8. The apparatus of claim 1, the registry interface further configured to receive a recurring heartbeat attestation from the remote hardware node, the processor being configured to monitor the recurring heartbeat attestation, wherein a failure to receive the recurring heartbeat attestation within an epoch-bound authorization window triggers a self-nullification of the unique derivation path.

9. The apparatus of claim 1, the monitoring interface comprising a hardware-logic circuit within the processor configured to autonomously trigger the revocation event when a locally-calculated variance parameter exceeds a hardware-bound threshold, independent of an external network signal.

10. A method for hardware-node lifecycle management, comprising:

- receiving, via a registry interface, an attested identity record from a remote hardware node;
- validating, via a processor, the attested identity record against a hardware root of trust;
- generating, via the processor, a unique derivation path for the remote hardware node to identify the remote hardware node as a sibling unit within a merchant lineage;
- publishing, via the processor, a permissioning state to a persistent ledger, the permissioning state being configured to authorize a synchronization node to accept records from the remote hardware node; and
- updating, via a monitoring interface, the permissioning state in response to a revocation event to nullify a capability of the remote hardware node to commit records to the persistent ledger.

11. The method of claim 10, wherein the attested identity record comprises a hardware-bound identifier and a cryptographic quote generated within a hardware-protected execution environment (HPEE) of the remote hardware node.

12. The method of claim 10, further comprising transmitting a lineage seed to the remote hardware node to initialize a local hierarchical deterministic (HD) key generator within a protected partition of the remote hardware node.

13. The method of claim 10, further comprising triggering the revocation event upon a detection of a non-sequential transaction index within a transaction record received from the remote hardware node.

14. The method of claim 10, further comprising monitoring a recurring heartbeat attestation from the remote hardware node, wherein a failure to receive the recurring heartbeat attestation within an epoch-bound authorization window triggers a self-nullification of the unique derivation path.

15. The method of claim 10, wherein the persistent ledger is a distributed ledger comprising a plurality of peer nodes configured to maintain the permissioning state via a consensus protocol.

16. The method of claim 10, wherein the synchronization node is located outside of a local administrative domain of the remote hardware node.

17. The method of claim 10, wherein the validation of the attested identity record occurs asynchronously relative to the publishing of the permissioning state.

18. A system for hardware-node lifecycle management, comprising:

a remote hardware node configured to transmit an attested identity record; and a lifecycle management apparatus comprising a registry interface, a memory, a monitoring interface, and a processor, the lifecycle management apparatus configured to:

validate the attested identity record against a hardware root of trust;

generate a unique derivation path for the remote hardware node to identify the remote hardware node as a sibling unit within a merchant lineage;

publish a permissioning state to a persistent ledger, the permissioning state being configured to authorize a synchronization node to accept records from the remote hardware node; and update the permissioning state via the monitoring interface in response to a revocation event to nullify a capability of the remote hardware node to commit records to the persistent ledger.

19. The system of claim 18, wherein the attested identity record comprises a hardware-bound identifier and a cryptographic quote generated within a hardware-protected execution environment (HPEE) of the remote hardware node.

20. The system of claim 18, the lifecycle management apparatus further configured to transmit a lineage seed to the remote hardware node to initialize a local hierarchical deterministic (HD) key generator within a protected partition of the remote hardware node.

21. The system of claim 18, the lifecycle management apparatus further configured to trigger the revocation event upon a detection of a non-sequential transaction index within a transaction record received from the remote hardware node.

22. The system of claim 18, the lifecycle management apparatus further configured to monitor a recurring heartbeat attestation from the remote hardware node, wherein a failure to receive the recurring heartbeat attestation within an epoch-bound authorization window triggers a self-nullification of the unique derivation path.

23. The system of claim 18, wherein the persistent ledger is a distributed ledger comprising a plurality of peer nodes configured to maintain the permissioning state via a consensus protocol.

24. The system of claim 18, wherein the synchronization node is located outside of a local administrative domain of the remote hardware node.

25. The system of claim 18, wherein the validation of the attested identity record occurs asynchronously relative to the publishing of the permissioning state.

26. A non-transitory computer-readable medium storing instructions that, when executed by a processor of a hardware-node lifecycle management apparatus, cause the processor to perform operations comprising:

receiving an attested identity record from a remote hardware node;

validating the attested identity record against a hardware root of trust;

generating a unique derivation path for the remote hardware node to identify the remote hardware node as a sibling unit within a merchant lineage;

publishing a permissioning state to a persistent ledger, the permissioning state being configured to authorize a synchronization node to accept records from the remote hardware node; and updating the permissioning state in response to a revocation event to nullify a capability of the remote hardware node to commit records to the persistent ledger.

27. The non-transitory computer-readable medium of claim 26, wherein the attested identity record comprises a hardware-bound identifier and a cryptographic quote generated within a hardware-protected execution environment (HPEE) of the remote hardware node.

28. The non-transitory computer-readable medium of claim 26, the operations further comprising transmitting a lineage seed to the remote hardware node to initialize a local hierarchical deterministic (HD) key generator within a protected partition of the remote hardware node.

29. The non-transitory computer-readable medium of claim 26, wherein the persistent ledger is a distributed ledger comprising a plurality of peer nodes configured to maintain the permissioning state via a consensus protocol.

30. The non-transitory computer-readable medium of claim 26, wherein the validation of the attested identity record occurs asynchronously relative to the publishing of the permissioning state.

* * * * *